(12) United States Patent
Ruan et al.

(10) Patent No.: US 10,158,405 B2
(45) Date of Patent: Dec. 18, 2018

(54) INTERFERENCE ALIGNMENT FOR PARTIALLY CONNECTED CELLULAR NETWORKS

(71) Applicant: The Hong Kong University of Science and Technology, Kowloon, Hong Kong (CN)

(72) Inventors: Liangzhong Ruan, Hong Kong (CN); Vincent Kin Nang Lau, Hong Kong (CN); Xiongbin Rao, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 26 days.

(21) Appl. No.: 14/375,775

(22) PCT Filed: Feb. 21, 2013

(86) PCT No.: PCT/CN2013/000165
§ 371 (c)(1),
(2) Date: Jul. 30, 2014

(87) PCT Pub. No.: WO2013/127254
PCT Pub. Date: Sep. 6, 2013

(65) Prior Publication Data
US 2014/0376655 A1   Dec. 25, 2014

Related U.S. Application Data

(60) Provisional application No. 61/634,264, filed on Feb. 27, 2012.

(51) Int. Cl.
*H04B 7/02*    (2018.01)
*H04L 1/02*    (2006.01)
(Continued)

(52) U.S. Cl.
CPC .......... *H04B 7/046* (2013.01); *H04B 7/0413* (2013.01); *H04B 7/0456* (2013.01); *H04L 1/06* (2013.01)

(58) Field of Classification Search
CPC .. H04L 25/0204; H04L 1/0003; H04B 7/0634
See application file for complete search history.

(56) References Cited

U.S. PATENT DOCUMENTS 9,048,977 B2 * 6/2015 Ramprashad ......... H04L 1/0003
2006/0098760 A1 * 5/2006 Shen ................... H04B 7/0417
375/299
(Continued)

FOREIGN PATENT DOCUMENTS

CN    102195757 A    9/2011
CN    102271006 A    12/2011

OTHER PUBLICATIONS

Ruan, et al. "Interference Alignment Algorithm for Quasi-static MIMO Cellular System", 2011 IEEE Global Telecommunications Conference, Dec. 9, 2011, 5 pages.
(Continued)

*Primary Examiner* — Shuwang Liu
*Assistant Examiner* — Gina McKie
(74) *Attorney, Agent, or Firm* — Amin, Turocy & Watson, LLP

(57) ABSTRACT

Interference alignment for a multiple-input multiple-output communications network with partial connectivity is provided. A method is provided that includes determining assignments for data streams transmitted in the multiple-input multiple-output communications network. The method also includes suppressing inter-cell interference and suppressing intra-cell interference. Also provided is inter-cell/intra-cell decomposition and exploitation of partial connectivity in a multiple-input multiple-output communications
(Continued)

network. The multiple-input multiple-output communications network can comprise three or more cells.

20 Claims, 10 Drawing Sheets

(51) Int. Cl.
  *H04B 7/0456* (2017.01)
  *H04L 1/06* (2006.01)
  *H04B 7/0413* (2017.01)

(56) References Cited

U.S. PATENT DOCUMENTS

| | | | |
|---|---|---|---|
| 2006/0120473 A1* | 6/2006 | Baum | 375/260 |
| 2010/0284359 A1* | 11/2010 | Kim et al. | 370/329 |
| 2011/0051837 A1 | 3/2011 | Park et al. | |
| 2011/0195678 A1* | 8/2011 | Luo | H04B 7/0617 455/114.3 |
| 2012/0046038 A1* | 2/2012 | Gao | H04W 28/16 455/447 |
| 2012/0069824 A1 | 3/2012 | Papadopoulos et al. | |
| 2012/0077485 A1* | 3/2012 | Shin et al. | 455/422.1 |
| 2012/0120892 A1* | 5/2012 | Freda | H04W 8/005 370/329 |
| 2012/0163433 A1 | 6/2012 | Koike-Akino et al. | |
| 2012/0281778 A1* | 11/2012 | Ruan | H04B 7/0456 375/267 |
| 2013/0272445 A1* | 10/2013 | Shen | H04B 7/0456 375/295 |
| 2014/0003274 A1* | 1/2014 | Clerckx | H04L 25/0204 370/252 |
| 2015/0131751 A1* | 5/2015 | Bayesteh | H04B 7/0413 375/267 |
| 2015/0381335 A1* | 12/2015 | Khojastepour | H04W 52/14 370/278 |

OTHER PUBLICATIONS

International Search Report dated Jun. 6, 2013 for PCT Application Serial No. PCT/CN2013/000165, 2 pages.
Cadambe, et al. "Interference alignment and degrees of freedom of the K-user interference channel," IEEE Trans. Inf. Theory, vol. 54, pp. 3425-3441, Aug. 2008.
Jafar, et al. "Degrees of freedom region of the MIMO X channel," IEEE Trans. Inf. Theory, vol. 54, No. 1, pp. 151-170, Jan. 2008.
Suh, et al. "Interference alignment for cellular networks," in 46th Annual Allerton Conference on Communication, Control, and Computing, Sep. 2008, pp. 1037-1044.
Suh, et al. "Downlink interference alignment," in Proc. IEEE GLOBECOM'10, Dec. 2010, pp. 1-5.
Sun, et al. "On the degrees of freedom of the cellular network," in Proc. IEEE ICC'10, May 2010, pp. 1-5.
Yamada, et al. "Interference alignment in the 2×(1+N) MIMO model," in Proc. IEEE GLOBECOM'10, Dec. 2010, pp. 1963-1967.
Shin, et al. "On the design of interference alignment scheme for two-cell MIMO interfering broadcast channels," IEEE Trans. Wireless Commun., vol. 10, No. 2, pp. 437-442, Feb. 2011.
Gomadam, et al. "Approaching the capacity of wireless networks through distributed interference alignment," in Proc. IEEE GLOBECOM'08, Nov. 2008, pp. 1-6.
Yetis, et al. "Feasibility conditions for interference alignment," in Proc. IEEE GLOBECOM'09, Nov. 2009, pp. 1-6.
Ruan, et al. "Dynamic interference mitigation for generalized partially connected quasi-static MIMO interference channel," IEEE Trans. Signal Process., vol. 59, No. 8., pp. 3788-3798, Aug. 2011.
Conway, et al. "Packing lines, planes, etc.: Packings in grassmannian spaces," Exper. Math., vol. 5, A K Peters Ltd, pp. 139-159, 1996.
Cheng, et al. "A scalable limited feedback design for network MIMO using per-cell product codebook," IEEE Trans. Wireless Commun., vol. 9, No. 10, pp. 3093-3099, Oct. 2010.
Ruan, et al. "Low complexity IA feasibility checking," CenWIT, The Hong Kong University of Science and Technology, Tech. Rep., Dec. 2010. 4 pages.
Asztely, et al. "Generalized array manifold model for wireless communication channels with local scattering," in Proc. Inst. Elect. Eng., Radar, Sonar Navig., vol. 145, No. 1, Feb. 1998, pp. 51-57.
Ruan, et al. "MIMO channel modeling with local scattering effect," CenWIT, The Hong Kong University of Science and Technology, Tech. Rep., Sep. 2010. 4 pages.
Dahrouj, et al. "Coordinated beamforming for the multicell multi-antenna wireless system," IEEE Trans. Wireless Commun., vol. 9, No. 5, pp. 1748-1759, May 2010.
Absil, et al. "On the largest principal angle between random subspaces," Linear Algebra and its Applications, vol. 414, pp. 288-294, 2006.

\* cited by examiner

INTERFERENCE ALIGNMENT FOR PARTIALLY CONNECTED CELLULAR NETWORKS

CROSS-REFERENCE TO RELATED APPLICATIONS

This application is a United States National Phase Application of, and claims priority to each of, PCT Application Number PCT/CN2013/000165, filed on Feb. 21, 2013, and entitled "INTERFERENCE ALIGNMENT FOR PARTIALLY CONNECTED CELLULAR NETWORKS", which claims priority to U.S. Provisional Application No. 61/634,264, filed Feb. 27, 2012, and entitled "INTERFERENCE ALIGNMENT OF PARTIALLY CONNECTED MIMO CELLULAR NETWORKS", the entireties of which applications are hereby expressly incorporated herein by reference.

TECHNICAL FIELD

This disclosure generally relates to wireless communications and, also generally, to interference alignment for partially connected cellular networks.

BACKGROUND

The wide adoption of mobile devices along with ubiquitous cellular data coverage has resulted in an explosive growth of mobile applications that expect always-accessible wireless networking. This explosion has placed demands on network performance including demands for fast and reliable communication paths and for reduction of interference in the network. On the user side, instances of slow communication links and/or communication failures have been blamed for user dissatisfaction. On the network side, the slow communication links and communication failures can develop due to interference that has not been adequately mitigated in the communications network.

The above-described background is merely intended to provide an overview of information regarding the effects of interference within a wireless communications network, and is not intended to be exhaustive. Additional context may become apparent upon review of one or more of the various non-limiting embodiments of the following detailed description.

BRIEF DESCRIPTION OF THE DRAWINGS

Various non-limiting embodiments are further described with reference to the accompanying drawings in which.

DETAILED DESCRIPTION

Figure 1:
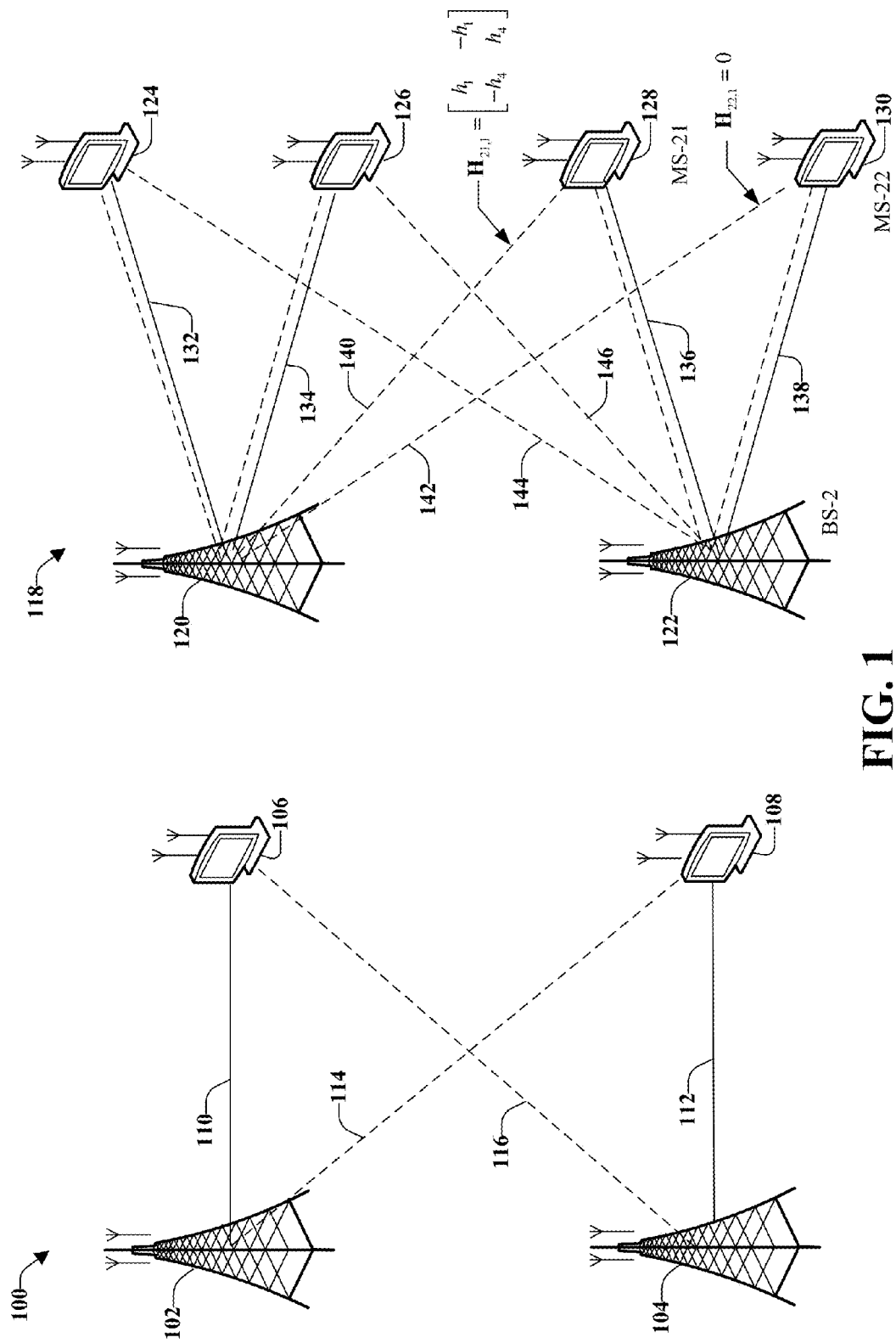
FIG. 1 are example, non-limiting cellular topologies that illustrate overlapping and partial connectivity in cellular networks.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Various aspects disclosed herein relate to interference alignment (IA) for cellular networks. In an aspect, the cellular network can be a multiple-input multiple-output (MIMO) cellular network that comprises partial connectivity. Partial connectivity refers to the scenario in which channel matrices between base stations and mobile devices in the network are not full rank. The term "rank" refers to a measure of the capacity of a channel. MIMO cellular networks can introduce several technical challenges as it relates to IA. For example, overlapping that occurs between direct links and interfering links due to the MIMO cellular topology can negatively affect IA. Further, the partial connectivity that occurs within the network and how to deal with the partial connectivity can negatively affect IA.

The disclosed aspects address the above, as well as other issues associated with IA in cellular networks, through an IA process. In an implementation, the IA process can be a three-stage IA process. Also provided herein is an analysis of the achievable degree of freedom (DoF) of the disclosed aspects for a symmetric partially connected MIMO cellular network. As will be discussed herein, the disclosed aspects can provide a DoF gain as compared with other IA processes. The DoF gain (which can be a significant gain according to some aspects) can be attributable, at least in part, to using partial connectivity as an advantage with the disclosed IA processes. According to some aspects, the derived DoF bound provided herein can be backward compatible with a DoF bound achieved on fully connected K-pair MIMO interference channels.

As previously mentioned, the wide adoption of mobile devices has increased the demand for always-accessible wireless networking. This demand has brought about a corresponding interest in the area of interference channels and associated interference mitigation techniques. For example, IA approaches can be utilized to mitigate interference in K-pair interference channels. For example, when there are multiple nodes simultaneously transmitting, IA processing can align the interference from different transmitters into a lower dimension subspace, which can provide the receivers with one or more "clean" dimensions to decode the desired signals. This in turn can improve system performance.

In one or more disclosed aspects, an IA approach can achieve an optimal, or near optimal, DoF in K-pair interference channels, as well as 2-pair MIMO-X channels. In an example, an IA approach can be extended to cellular OFDMA systems by exploiting a problem-specific structure, such as the channel states being full-rank diagonal matrices. In another example, the IA approach can be extended to MIMO cellular networks. The extension of IA to MIMO networks have focused on two-cell configurations with one data stream for each mobile station (MS), also referred to herein as mobile device or the like, or to a configuration with no more than two mobile devices in each cell. The extension of IA to general MIMO cellular networks (with an arbitrarily number of cells, mobile devices, and data streams) has not previously been achievable.

Furthermore, some IA techniques assume a fully connected interference topology. In practice, however, there might be heterogeneous path losses between base stations (BSs) and MSs as well as spatial correlation in the MIMO channels. These physical effects induce a partially connected interference topology. Partial connectivity in interference topology may contribute to limiting the aggregate interference and this may translate into throughput gains in interference-limited systems. In order to exploit the partial connectivity in the channel as an advantage, the various aspects disclosed herein incorporate the partial connectivity topology in an IA process. Therefore, the disclosed aspects overcome various features inherent to MIMO cellular networks, such as partial connectivity and quasi-static fading, for example.

In an example, an IA process can be applied where interference channels can take advantage of the statistical independency of the direct links (e.g., the links from the transmitter to an intended receiver) and the cross-links (e.g., the links from the transmitter to unintended receivers), which allows for such links to be distinguished from each other. As a result, the IA process can achieve a defined (e.g., a target) number of data streams per each direct link with probability one (1), provided the interference channel is IA feasible. However, for MIMO cellular networks, there is overlapping between the direct links and the cross-links. Due to the overlapping nature of the direct link and the cross-links, brute force application of some interference alignment schemes in MIMO cellular systems may not result in the desired performance.

In another example, MIMO cellular systems can be partially connected due to path losses and spatial correlation. While path losses and spatial correlation effects are undesirable for the direct links, they may also contribute to limiting the strength and the dimension of the aggregate interference on the cross-links. In practice, however, many parameters are used to quantify path losses and spatial correlation. These parameters can vary (at time dramatically) according to different physical scenarios. Therefore, an IA process, which can exploit the benefit of partial connectivity, is disclosed herein.

In a further example, some interference algorithms use infinite dimensions of signal space obtained through time-domain symbol extension, which is difficult to realize in practice. In one example, an interference alignment feasibility-checking algorithm involves a huge complexity of $O(2^{N^2})$, where N is the total number of nodes (e.g., devices) in the network. This complexity is not tolerable in a practical application. Therefore, provided herein is an IA algorithm that does not exploit symbol extension.

Disclosed herein is an IA approach that exploits the partial connectivity topology in MIMO cellular networks. An optimization-based approach is used to decompose the IA process into three sub-processes, which overcomes the above noted issues and hence accommodates the MIMO cellular topology and the partial connectivity. Moreover, a low complexity IA feasibility determination (e.g., checking algorithm) is provided. For example, in an implementation, an algorithm that has a worst-case complexity of $O(N^3)$ only is provided. In view of the disclosed aspects, an achievable bound on the DoF in a symmetric partially connected MIMO cellular network is derived. Further, it is demonstrated herein that by using the disclosed aspects, the partial connectivity can be exploited to increase the total DoF in the MIMO cellular networks.

Referring initially to FIG. 1, example, non-limiting cellular topologies are depicted that illustrate overlapping and partial connectivity in cellular networks. As illustrated, a first topology 100 can include a first base station 102 and a second base station 104. Also included can be a first mobile device 106 and a second mobile device 108. The base stations and mobile devices in this example have two antennas each. A direct link 110, between the first base station 102 and the first mobile device 106, carries a desired signal (e.g., the signal intended for the first base station 102 and the first mobile device 106). In a similar manner, a direct link 112, between the second base station 104 and the second mobile device 108, carries a desired signal for the second base station 104 and the second mobile device 108. Between the first base station 102 and the second mobile device 108 is a cross-link 114, which carries an undesired signal. Further, between the second base station 104 and the first mobile device 106 is a cross-link 116, which carries an undesired signal.

The second topology 118 is illustrated as including a first base station 120 and a second base station 122, having two antennas each. Further, the second topology 118 is illustrated as including a first mobile device 124, a second mobile device 126, a third mobile device 128, and a fourth mobile device 130, having two antennas each.

Between the first base station 120 and the first mobile device 124 is a first set of links 132, which carry two signals, which include the desired signal (e.g., the symbols for the first mobile device 124) and an undesired signal (e.g., the symbols for the second mobile device 126). Further, a second set of links 134, between the first base station 120 and the second mobile device 126, carry two signals, which include a desired signal (e.g., symbols for the second mobile device 126) and an undesired signal (e.g., symbols for the first mobile device 124).

In a similar manner, a third set of links 136 between the second base station 122 and the third mobile device 128 carry both a desired signal (e.g., symbols for the third mobile device 128) and an undesired signal (e.g., symbols for the fourth mobile device 130). In addition, a fourth set of links 138 between the second base station 122 and the fourth mobile device 130 carry both a desired signal (e.g., symbols for the fourth mobile device 130) and an undesired signal (e.g., symbols for the third mobile device 128).

Further, due to the broadcast nature of the transmissions, the first base station 120 sends a first undesired link 140 to the third mobile device 128 and a second undesired link 142 to the fourth mobile device 130. In a similar manner, the second base station 122 sends a third undesired link 144 to the first mobile device 124 and a fourth undesired link 146 to the second mobile device 126.

As discussed with reference to FIG. 1, in point-to-point networks, a link carries either a desired signal or an undesired signal. However, in cellular networks, intra-cell links carry both desired signals and undesired signals. Since the two types of links (e.g., the link carrying the desired signal and the link carrying the undesired signal) are overlapped, when minimizing the interference leakage according to the channel state information of cross-links, at least a portion of the desired signals on the direct links might be unintentionally cancelled.

Figure 2:
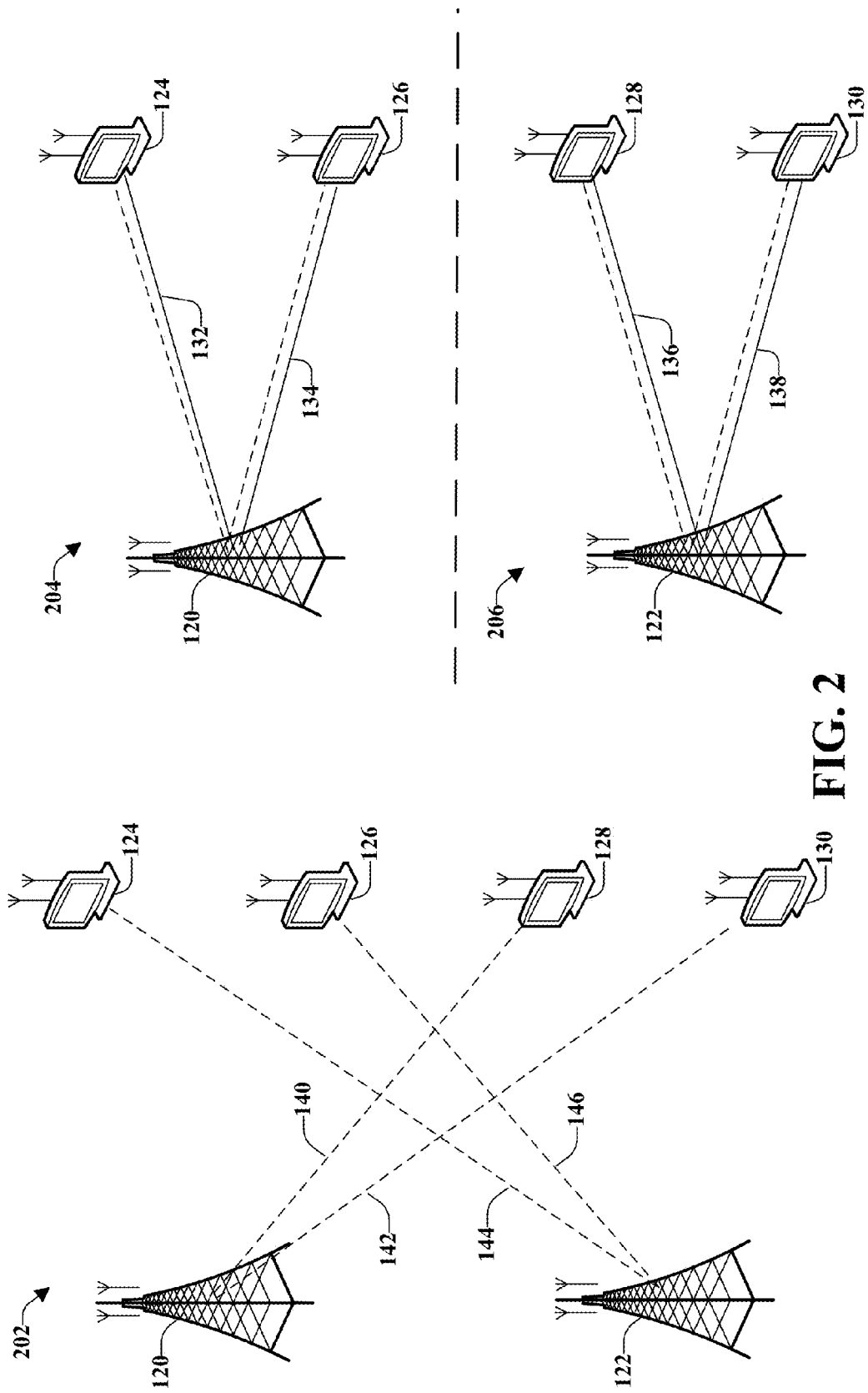
FIG. 2 are example, non-limiting cellular topologies that illustrate decomposition of inter-cell and intra-cell interference alignment in multiple-input multiple-output cellular networks according to various embodiments.

FIG. 2 depicts example, non-limiting cellular topologies that illustrate decomposition of inter-cell and intra-cell IA in MIMO cellular networks according to various embodiments. FIG. 2 is similar to the second topology 118 of FIG. 1 and, therefore, for purposes of simplicity, the same element numbers will be utilized. The left side of FIG. 2 illustrates an inter-cell IA topology 202 and the right side of FIG. 2 illustrates an intra-cell IA topology 204 for the first base station 120 and an intra-cell IA topology 206 for the second base station 122.

As illustrated by the inter-cell IA topology 202, by decomposing the inter-cell interference alignment, there is no overlap with the direct links. Therefore, the inter-cell interface alignment can be handled with a basic iterative interference alignment process.

Further, the intra-cell interference alignment for each of the base stations is decoupled to a per-cell basis, illustrated by intra-cell IA topology 204 and intra-cell IA topology 206. This decoupling to a per-cell basis can make the IA simpler to implement, according to an aspect.

Figure 3:
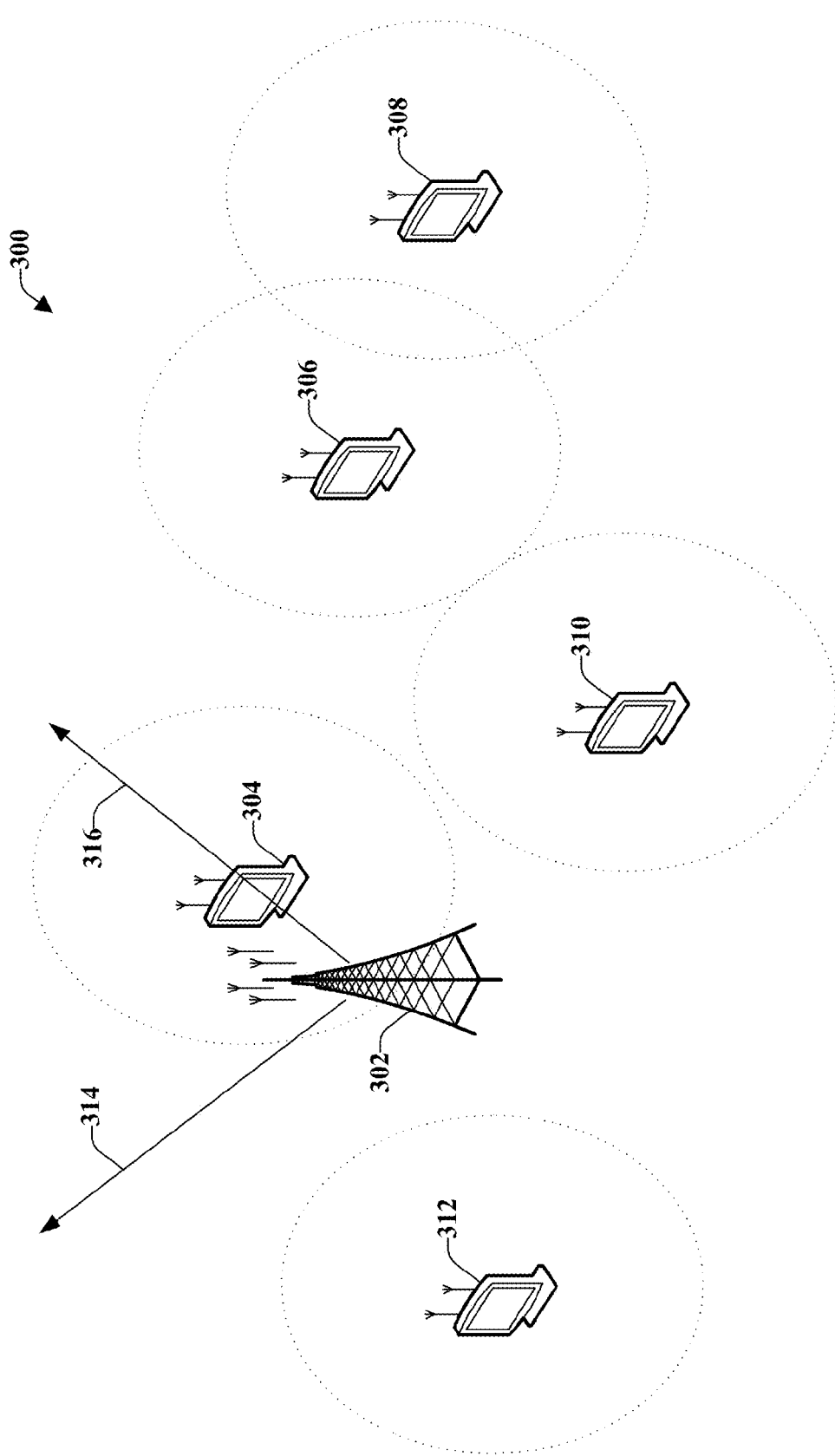
FIG. 3 illustrates an example, non-limiting embodiment of a wireless network that depicts subspace constraints exploiting partial connectivity.

According to one or more implementations, decomposition of the inter-cell and intra-cell IAs can be implemented through a structure in a precoder design. Further, partial connectivity can offer an additional opportunity to cancel interference. Various implementations discussed herein exploit this opportunity under the IA framework by introducing subspace constraints in a transceiver design. For example, FIG. 3 illustrates an example, non-limiting embodiment of a wireless network 300 that depicts subspace constraints exploiting partial connectivity. Illustrated are a first base station 302 and five mobile stations (MSs) labeled as first MS 304, second MS 306, third MS 308, fourth MS 310, and fifth MS 312. The arrows 314 and 316 depict the subspace constraint restricted in the transmission direction. As discussed herein, these constraints can be designed such that a large fraction of interference is cancelled at a cost of slightly reducing the policy space of transceiver design.

Figure 4:
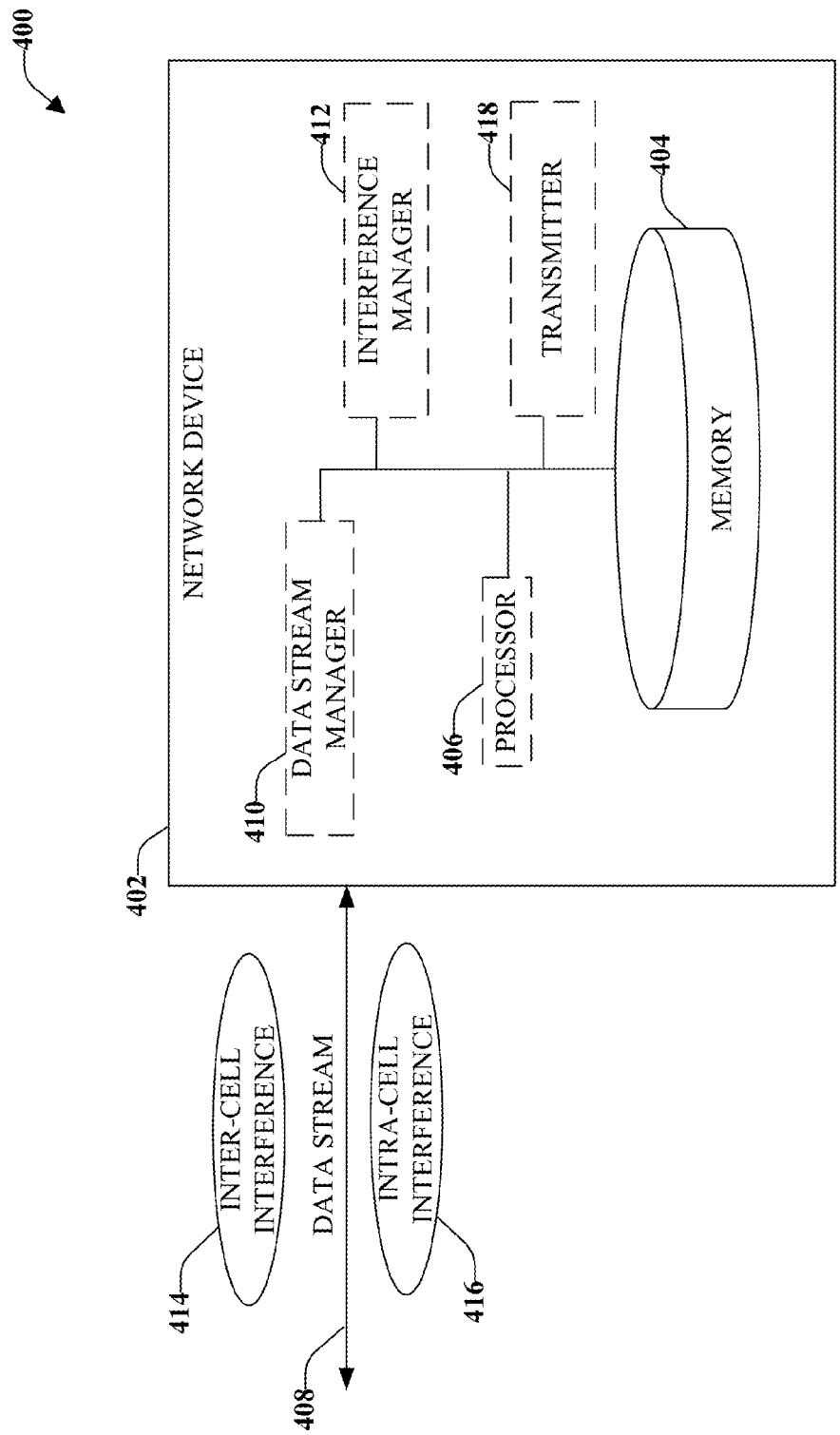
FIG. 4 is an example, non-limiting block diagram of a system configured to reduce interference within a communications network in accordance with an aspect.

According to an implementation, FIG. 4 is an example, non-limiting block diagram of a system 400 configured to reduce interference within a communications network. Interference not only limits the amount of bandwidth available to each device, but it can also limit the performance of each device. To reduce the amount of interference in the network, the system 400 is configured to exploit partial connectivity of the network.

Included in system 400 is a network device 402, which can be any one of a number of communication devices including, but not limited to, a base station, a network node, a mobile device, and so forth. The communications network can be a MIMO network, according to an aspect. Further, the communications network can comprise an arbitrary number of cells, users, antennas, or combinations thereof. For example, the disclosed aspects can be applied to a network, regardless of the number of cells, users, and/or antennas. According to an implementation, the communications network comprises three or more cells (e.g., base stations), wherein the network device 402 communicates with each of the three or more base stations.

The network device 402 can comprise at least one memory 404 that can store computer executable components and instructions. The network device 402 can also include at least one processor 406, communicatively coupled to the at least one memory 404. Coupling can include various communications including, but not limited to, direct communications, indirect communications, wired communications, and/or wireless communications. The processor 406 can facilitate execution of the computer executable components stored in the memory 404. The processor 406 can be directly involved in the execution of the computer executable component(s), according to an aspect. Additionally or alternatively, the processor 406 can be indirectly involved in the execution of the computer executable component(s). For example, the processor 406 can direct one or more components to perform the operations.

It is noted that although one or more computer executable components may be described herein and illustrated as components separate from the memory 404 (e.g., operatively connected to memory), in accordance with various embodiments, the one or more computer executable components could be stored in the memory 404. Further, while various components have been illustrated as separate components, it will be appreciated that multiple components can be implemented as a single component, or a single component can be implemented as multiple components, without departing from example embodiments.

The network device 402 can be configured to receive, either directly or indirectly (e.g., through another component, through another device, and so forth) data streams 408 transmitted within the communications network. The data streams 408 can include various types of communication including voice, video, data, and so on. Although only a single data stream is illustrated, it is noted that any number of intra-cell data streams can be received and processed by the network device 402 according to various implementations. In an example, BSs only transmit data to MSs that are associated with the BSs. Thus, the data streams are intra-cell data streams. However, these streams create both inter- and intra-cell interference.

A data stream manager 410 can be configured to evaluate the data streams 408 and determine the feasibility of interference alignment (IA) within the communications network. In implementation, data stream manager 410 can be configured to determine assignments for the data streams 408 transmitted in the communications network. For example, an assignment (or stream assignment $\{d_{nj}\}$) can be utilized to maximize a sum of the data stream numbers (e.g., degree of freedom (DoF)) of the communications network. According to an implementation, the data stream manager 410 can utilize a greedy stream assignment to assign the data streams 408. Based in part on the assignments, the data stream manager 410 can determine if it would be beneficial to apply IA in the communications network.

According to some implementations, the data stream manager 410 can be configured to initialize a stream assignment policy and determine whether interference alignment can be applied to the data streams 408 in the communications network. For example, initializing the stream assignment policy can include setting the stream assignment policy to be the number of streams requested by each mobile device within the communications network.

An interference manager 412 can be configured to suppress inter-cell interference 414 and intra-cell interference 416 caused by the data stream 408. The suppression of the inter-cell interference 414 and the intra-cell interference 416 can be performed independently, or concurrently. According to an implementation, suppressing the inter-cell interference 414 can comprise updating intermediate precoders and decorrelators. In an example, precoders are used to exploit transmit diversity by weighting each of the information streams. For example, a transmitter 418 can send the coded information to a receiver (e.g., base station, mobile device, a network entity, and so forth), wherein the weighting can be utilized to mitigate interference. In another example, the decorrelators can be updated in order to reduce autocorrelation in a signal (or to reduce cross-correlation within a set of signals), wherein other aspects of the signal are not updated (e.g., are preserved). The updated decorrelators can also be communicated to one or more other devices by the transmitter 418.

Further to this implementation, after the intermediate precoders and decorrelators are updated, the precoders can be adjusted (e.g., by the interference manager 412) a second time to suppress the intra-cell interference 416. The second adjustment to the precoders can be sent by the transmitter 418 to one or more other devices. According to another implementation, the inter-cell interference 414 and the intra-cell interference 416 can be zero forced in order to cancel interference and facilitate interference alignment.

For the following discussion, the notation a represents scalar, the notation a represents vector, the notation A represents matrix, and the notation A represents set/space. Further, the operator $(\bullet)^T$ denotes transpose, the operator $(\bullet)^H$ denotes hermitian, the operator rank $(\bullet)$ denotes rank, the operator trace $(\bullet)$ denotes trace, and the operator $|(\bullet)|$ denotes dimension (of a space). Further span $(\{a\})$ denotes the linear space spanned by the vectors in $\{a\}$. In addition, $\text{span}_c(\{A\})$ and $\text{span}_r(\{A\})$ represent the space spanned by the column vectors and the row vectors of A, respectively. Further, G(S,N) denotes the Grassmannian, which represents the space of all the S dimensional subspaces of the N dimensional space. It is also noted that R represents the set of real numbers and C represents the set of complex numbers.

In an example, a MIMO system with G base stations (BSs), each of which serves K mobile stations (MSs) is provided (as depicted by the second topology 118 of FIG. 1). It is noted that G and K are integers greater than or equal to one, and can be the same or different integers. The number of antennas at BS-g is denoted by $N_g^t$ and the k-th MS of BS-g is denoted by $N_{gk}^r$. Further, the number of data streams transmitted to the k-th MS from BS-g is denoted by $d_{gk}$. The received signal at the k-th MS of BS-g can be given by:

$$y_{gk} = U_{gk}\left(\sum_{n=1}^{G} H_{gk,n} \sum_{i=1}^{K} V_{ni}x_{ni} + z\right), \forall k \in \{1, \ldots, K\}. \quad \text{Equation 1}$$

where $H_{gk,n} \in C^{N_{gk}^r \times N_n^t}$ is the channel state information (CSI) from BS-n to the k-th MS from BS-g. Also, $x_{ni} \in C^{d_{ni} \times 1}$, $V_{ni} \in C^{N_n^t \times d_{ni}}$, and $U_{ni} \in C^{d_{ni} \times N_{ni}^r}$ are the information symbols, the precoding matrix, and the decorrelation matrix, respectively, for the i-th MS of the BS-g. Further, $z \in C^{N_{gk}^r \times 1}$ is the zero mean white Gaussian noise with unity variance. The CSI matrices $\{H_{gk,n}\}$ are assumed to be quasi-static and mutually independent random matrices. Further, the precoding matrix and the transmit symbols are normalized as $\text{trace}(V_{ni}^H V_{ni}) = d_{ni}$ and $E[\sum_{i=1}^{K}\text{trace}(x_{ni}^H x_{ni})] = P_n$ such that the total transmit power from BS-n is $P_n$.

As used herein, partial connectivity can be defined between BS-n and the k-th MS from BS-g as the null space and the "transposed" null space of the CSI $H_{gk,n}$. The null space is given by $N'(H_{gk,n}) @ \{u \in \mathbb{C}^{N_n^t}: H_{gk,n}v = 0\}$. The transposed null space is given by: $N'(H_{gk,n}) @ \{u \in \mathbb{C}^{N_{gk}^r}: u^H H_{gk,n} = 0\}$.

Partial connectivity is utilized herein to describe (e.g., in the physical sense) the effective subspaces of the channel matrices between BSs and MSs in the network. For example, the null spaces and the transposed null spaces, $\{N(H_{gk,n}), N'(H_{gk,n})\}$, represent the subspaces that cannot be perceived by the BSs and the MSs, respectively. Thus, the partial connectivity topology of the MIMO network is parameterized by the null spaces $\{N(H_{gk,n}), N'(H_{gk,n})\}$. Further, both the inter-cell links (e.g., $g \neq n$) and the intra-cell links (e.g., g=n) may be partially connected.

A few examples, with reference to the second topology 118 of FIG. 1 are provided to illustrate how the partial connectivity model, as described above, corresponds to various physical situations. For purposes of these examples, the third mobile device 128 is denoted as MS-21, the fourth mobile device 130 is denoted as MS-22, and the second base station 122 is denoted as BS2. In these examples, the following is denoted:

$$H_{gk,n} = \begin{bmatrix} h_{gk,n}(1) & h_{gk,n}(2) \\ h_{gk,n}(3) & h_{gk,n}(4) \end{bmatrix}.$$

For a fully connected network (e.g., fully connected MIMO cellular network), if $h_{gk,n}(i), g \in 1,2, k \in 1,2, i \in \{1,3,4\}$ are independent random variables. This results in $N(H_{gk,n}) = N'(H_{gk,n}) = \{0\}$ and $\forall g,k$, which corresponds to a fully connected network.

As an example related to a MIMO cellular network with spatial correlation, the elements of $H_{21,1}$ are correlated as $h_{21,1}(1) = h_{21,1}(2)$, $h_{21,1}(3) = h_{21,1}(4)$. This results in $N(H_{21,1}) = \text{span}_c([1,1]^t)$, $$N'(H_{21,1}) = \text{span}_c\left(\left[1, -\frac{h_{21,1}(1)}{h_{21,1}(3)}\right]^t\right).$$

For a MIMO cellular network with heterogeneous path losses, in an example, the path loss from the first base station (BS-1) to the second MS of the second base station (BS-2) is 60 dB and the transmit signal to noise ratio (SNR) of BS-1 is 40 dB. The interference power from BS-1 can be negligible as compared with the Gaussian noise, therefore, it can be given that $H_{21,1} = 0$, which results in $N(H_{22,1}) = N'(H_{22,1}) = C^2$, as illustrated in the second topology 118 of FIG. 1.

Stream assignment and transceiver design under IA constraints will now be described. It can be assumed that the BSs in the MIMO cellular network share global channel state information (CSI) $\{H_{gk,n}\}$. It should be noted that global CSI can be fairly easy to obtain when the network size is small. However, when the network size is large, the partial connectivity can be exploited to achieve scalable CSI feedback schemes, such as by utilizing a heterogeneous path loss, for example.

According to an implementation, an IA approach is used in order to maximize the network total DoF, which can be defined by $$D = \lim_{P \to \infty} \frac{C}{\log(P)},$$

where C is the network sum throughput and P is the total transmit power. It is noted that, C=D log(P)+O(log(P)), DoF provides a first order estimation on network throughput. Further, it can offer, at least some first order simplification to the complex throughput optimization on a MIMO interference network.

In accordance with an aspect, the data stream assignment $\{d_{nj}\}$, precoders $\{V_{nj}\}$, and decorrelators $\{U_{nj}\}$, $n \in \{1, \ldots, G\}, \ldots, j \in \{1, \ldots, K\}$ policies are jointly optimized in order to maximize the total number of data streams $\Sigma_{n=1}^{G} \Sigma_{k=1}^{K} d_{nj}$ under the IA constraints. For example, according to an implementation, the constraints can be that the number of data streams is equal, or nearly equal, to the DoF of the network.

A challenge associated with IA for MIMO cellular networks, therefore, can be expressed as:

$$\max_{\{d_{nj}\},\{V_{nj}\},\{U_{gk}\}} \sum_{n=1}^{G} \sum_{j=1}^{K} d_{nj}. \qquad \text{Equation 2}$$

s.t.: $\text{rank}(U_{gk} H_{gk,g} V_{gk}) = d_{gk},$. Equation 3

$U_{gk} H_{gk,n} V_{nj} = 0,$. Equation 4

$\text{trace}(V_{nj}^H V_{nj}) = d_{nj},$. Equation 5

$d_{nj} \in \{0, 1, \ldots, d_{nj}^{max}\}, \forall g, n \in \{1, \ldots, G\},$
$k, j \in \{1, \ldots, K\}, (n, j) \neq (g, k).$ where $d_{nj}^{max}$ is the maximum number of data streams for the concerned MS. Equation 3 helps to ensure that all the direct links have sufficient rank to receive the desired signals. Further, Equation 4 helps to ensure that all the undesired signals are aligned and do not interfere with the desired signals.

The following will solve the IA issue discussed above for fully connected MIMO cellular networks. Specifically, in a fully connected MIMO cellular network, it can be assumed dim $(N(H_{gk,n}))=(N_n^t-N_{gk}^r)+$, and dim$(N'(H_{gk,n}))=(N_{gk}^r-N_n^r)+$, where dim(X) denotes the dimension of subspace X, $(a)^+ = \max(\alpha, 0)$.

In MIMO cellular networks, an approach for IA for interference channel can be based on the interference leakage minimization iteration, for example. Although this approach might be designed for standard interference channels, according to an aspect, the framework can be extended to a MIMO cellular network, as described below.

According to an example, to extend an iterative IA algorithm to MIMO cellular networks, precoders $V_{nj}$ and decorrelators $U_{gk}$ can be alternatively updated by minimizing total interference leakage expressions (Equations 6 and 7 below) until the algorithm converges.

$$\min_{\substack{V_{nj} \in C^{N_n^t \times d_{nj}} \\ V_{nj}^H V_{nj} = I}} \sum_{g=1}^{G} \sum_{\substack{k=1 \\ (g,k) \neq (n,j)}}^{K} \text{trace}((U_{gk} H_{gk,n} V_{nj})^H (U_{gk} H_{gk,n} V_{nj})). \qquad \text{Equation 6}$$

$$\min_{\substack{U_{gk} \in C^{d_{gk} \times N_{gk}^r} \\ U_{gk} U_{gk}^H = I}} \sum_{n=1}^{G} \sum_{\substack{j=1 \\ (n,j) \neq (g,k)}}^{K} \text{trace}((U_{gk} H_{gk,n} V_{nj})^H (U_{gk} H_{gk,n} V_{nj})). \qquad \text{Equation 7}$$

$\forall n, g \in [1, \ldots, G], j, k \in \{1, \ldots, K\}.$

The performance of the naive algorithm has been tested in a three-BS fully connected MIMO cellular network with K=2, $N_g^t$=5, $N_{gk}^r$=2, $d_{gk}$=1, $\forall g \in \{1,3\}, k \in \{1,2\}$. It was shown that the naive algorithm could achieve a total DoF of three (3), which is only half of the achievable DoF lower bound and demonstrates that naive extension of an iterative IA algorithm might perform poorly in MIMO cellular networks. This poor performance can be attributable to the direct link/cross-link overlapping, as discussed above with reference to FIG. 2, and which will be further defined below.

In an interference network, the set of channels that carry the desired signals can be denoted as $H^D$ and the set of channels that carry the undesired signals can be denoted as $H^C$. If $H^D \cap H^C \neq \emptyset$, then the network has a direct link/cross-link overlap.

As illustrated in the first topology 100 of FIG. 1, in some MIMO interference networks $H^D = \{H_{mm}\}$ and $H^C = \{H_{mn}: m \neq n\}$, where m is the index for the transmitters and n is the index for the receivers. In the illustrated example, $H^D \cap H^C = \emptyset$ and there are no overlapping issues. However, as illustrated in the second topology 118 of FIG. 1, in a MIMO cellular network, when the number of MSs per cell is more than one (K>1), the intra-cell links also carry over undesired signals and, therefore, $H^D = \{H_{gk,g}\}$ and $H^C = \{H_{gk,n}\}$. In this scenario, $H^D \cap H^C = H^D \neq \emptyset$ and the overlapping issue arises. In an example, as the channel states in $H^D$ appear (in Equations 6 and 7), the precoders and decorrelators can be updated (e.g., according to Equations 6 and 7). Further, the dimension of the signal space for the desired signals can also be reduced.

According to an implementation, instead of a naive extension of an iterative IA algorithm, one or more of the disclosed aspects decompose the issues associated with IA for MIMO cellular networks (e.g., with reference to Equations 2 through 5) into three sub-issues. For example, as illustrated by the example, non-limiting system 500 of FIG. 5, a data stream manager 410 can be configured to facilitate stream assignment and an interference manager 412 can be configured to facilitate suppression of inter-cell interference 414 and intra-cell interference 416.

An allocation module 502 can be configured to perform stream assignment according to the following:

$$\max_{\{d_{nj}\}} \sum_{n=1}^{G} \sum_{j=1}^{K} d_{nj}. \qquad \text{Equation 8}$$

S.t. $\sum_{\substack{(g,k) \in S_U, (n,j) \in S_V \\ g \neq n}} d_{gk} d_{nj} \leq \qquad \text{Equation 9}$ $$\sum_{(n,j) \in S_V} d_{nj} \left( N_n^t - \sum_{k=1}^{K} d_{nk} \right) + \sum_{(g,k) \in S_U} d_{gk} (N_{gk}^r - d_{gk})$$

$\forall S_V, S_U \subseteq S,$ where $S = \{(g, k): g \in \{1, \ldots, G\}, k \in \{1, \ldots, K\}\}.$ A first updater 504 can be configured to perform inter-cell interference suppression given by:

$$\min_{V_{nj}^F, U_{gk}} \sum_{\substack{g=1 \\ \neq n}}^{G} \sum_{k=1}^{K} \text{trace}((U_{gk}H_{gk,n}V_{nj}^I)^H(U_{gk}H_{gk,n}V_{nj}^I)).$$ Equation 10

$$\text{S.t. } V_{nj}^I = V_{nj}^C + S_n V_{nj}^F, V_{nj}^F \in C^{(N_n^t - \sum_{k=1}^{K} d_{nk}^*) \times d_{nj}^*}.$$ Equation 11

$$U_{gk}U_{gk}^H = I, U_{gk} \in C^{d_{gk} \times N_{gk}^r}.$$ Equation 12

$\forall g \in \{1, \ldots, G\}$, $k \in \{1, \ldots, K\}$, where: $\{d^*_{nj}\}$ are solved by the allocation module 502 during the stream assignment, matrices $V_{nj}^C \in C^{N_n^t \times d_{nj}^*}$, $S_n \in C^{N_n^t \times (N_n^t - \sum_{k=1}^{K} d_{nk}^*)}$, are isometry matrices whose row vectors combined together form a basis for $C^{N_n^t \times 1}$, for example, $$[V_{n1}^C, V_{n2}^C, \ldots, V_{nK}^C, S_n]^H [V_{n1}^C, V_{n2}^C, \ldots V_{nK}^C, S_n] = I.$$ Equation 13.

Figure 5:
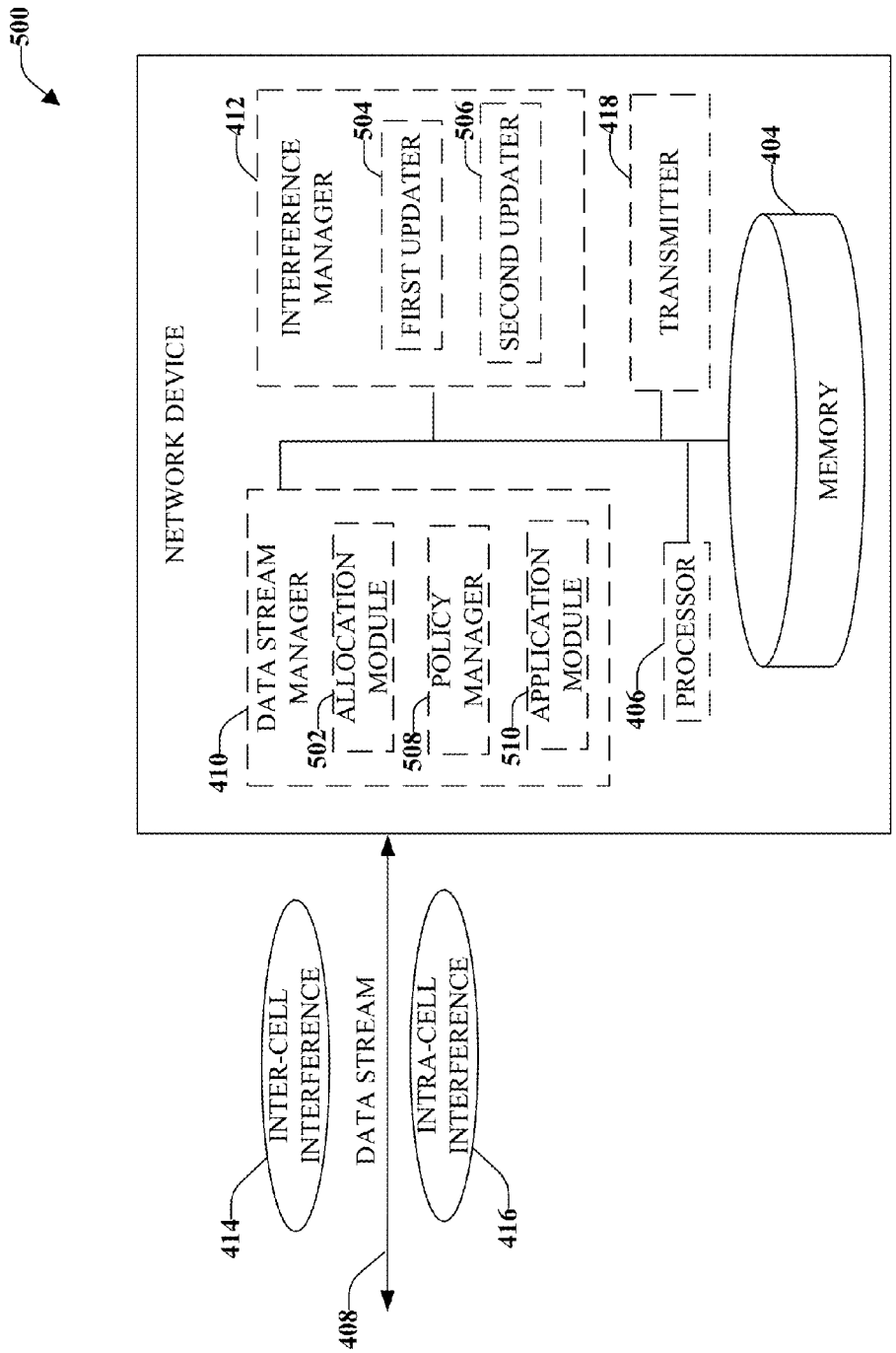
FIG. 5 is an example, non-limiting block diagram of a system for interference alignment, according to an aspect.

With continuing reference to FIG. 5, a second updater 506 can be configured to perform intra-cell interference suppression, where $$\min_{V_{nj}} \sum_{k=1, \neq j}^{K} \text{trace}((U_{nk}^* H_{nk,n} V_{nj})^H (U_{nk}^* H_{nk,n} V_{nj})).$$ Equation 14

$$\text{S.t. } (V_{nj})^H V_{nj} = I.$$ Equation 15

$$\text{rank}(U_{nj}^* H_{nj,j} V_{nj}) = d_{nj}^*.$$ Equation 16

$$\text{span}_c([V_{n1}, V_{n2}, \ldots, V_{nK}]) \subseteq \text{span}_c([V_{n1}^{I*}, V_{n2}^{I*}, \ldots, V_{nK}^{I*}]).$$ Equation 17 where $\{V_{nj}^{I*}\}$ and $\{U^*_{nj}\}$, $n \in \{1, \ldots, G\}$, $j \in \{1, \ldots, K\}$, are the solutions obtained by the first updater 504, and $\text{span}_c(X)$ denotes the linear space spanned by the row vectors of X. Further details related to the configurations of the allocation module 502, the first updater 504, and the second updater 506 will be provided below.

To appreciate the disclosed aspects, the following provides a connection between an initial IA solution and the IA solution decomposed by the allocation module 502, the first updater 504, and the second updater 506. For fully connected MIMO cellular networks with i.i.d. channel matrices $\{H_{gk,n}\}$, the variables optimized by IA for MIMO cellular networks (e.g., refer to Equations 2 through 5) is given by $(\{d^*_{gk}\}, \{U^*_{gk}\}, \{V^*_{gk}\})$ with probability one (1), where $\{d^*_{gk}\}$; $\{U^*_{gk}\}$, $\{V^*_{gk}\}$ are the solutions derived by the allocation module 502, the first updater 504, and the second updater 506, respectively. In addition the optimal value of IA for MIMO cellular networks (e.g., refer to Equations 2 through 5) is $D^* = \sum_{n=1}^{G} \sum_{j=1}^{K} d^*_{nj}$.

The allocation module 502 can determine the stream assignment $\{d_{nj}\}$ to maximize the sum of the data stream numbers (e.g., DoF) of the network, conditioned on the network being IA feasible, which can be determined by an application module 510, which will be discussed below. Further, the first updater 504 can update the intermediate precoders $\{V_{nj}^I\}$ and decorrelators $\{U_{gk}\}$ to suppress the inter-cell interferences. The second updater 506 can further adjust the precoders $\{V_{nj}\}$ to suppress the intra-cell interferences.

It is noted that after first updater 504 and second updater 506 perform the respective updates (e.g., the process of inter-cell and intra-cell interference mitigation is separated), only inter-cell channel states $\{H_{gk,n}\}$, $g \neq n$ are involved in the process employed by the first updater 504. This property can be utilized to overcome the cross-link/direct link overlapping issue as discussed above.

With reference to the intermediate precoder updated by the first updater 504 and the second updater 506, the structure of the intermediate precoder will now be described. In contrast to some iterative IA algorithms, the disclosed aspects utilize an auxiliary variable, namely the intermediate precoder variables $\{V_{nj}^I\}$. From Equation 11, $V_{nj}^I$ consists of the core space $V_{nj}^C$, the free space $S_n$, and the free elements $V_{nj}^F$. This precoder structure in the auxiliary variable can help to enable separation of inter-cell and intra-cell interference suppression.

The physical definition of Equation 17 will now be discussed. Equation 17 is introduced to assist to ensure that the desirable inter-cell interference alignment property obtained by the first updater 504 can be maintained during the precoder updates $\{V_{nj}\}$ performed by the second updater 506. This is due, at least in part, to the following. For example, suppose $\{U^*_{gk}\}$ and $\{V_{nj}^{I*}\}$ constitute the solution derived by the first updater 504. This results in $U^*_{gk}H_{gk,n}[V_{n1}^{I*}, V_{n2}^{I*}, \ldots, V_{nK}^{I*}] = 0$, $\forall g \neq n \in \{1, \ldots, G\}$. From Equation 17, there exists a matrix $R_n \in C^{\sum_{j=1}^{K} d_{nj} \times \sum_{j=1}^{K} d_{nj}}$ such that $[V_{n1}, V_{n2}, \ldots, V_{nK} = V_{n1}^{I*}, V_{n2}^{I*}, V_{nK}^{I*}] R_n$, which leads to the following equation:

$$U^*_{gk}H_{gk,n}[V_{n1}, V_{n2}, \ldots, V_{nK}] = U^*_{gk}H_{gk,n}[V_{n1}^{I*}, V_{n2}^{I*}, \ldots, V_{nK}^{I*}] R_n = 0 \cdot R_n = 0.$$ Equation 18.

Equation 18 illustrates that the inter-cell interference alignment property is preserved for the updated precoders $\{V_{nj}\}$ (e.g., the precoders updated by the second updater 506).

With continuing reference to the data stream manager 410 and the allocation module 502 of FIG. 5, the stream assignment is a combinatorial problem whose solution $\{d^*_{gk}\}$ can involve exhaustive search with exponential complexity with respect to the total number of MSs GK. For low complexity consideration, a greedy-based solution can be utilized, according to an implementation.

For the greedy stream assignment, a policy manager 508 can be configured to initialize a stream assignment policy (referred to as the "first step" for purposes of explanation). For example, the stream assignment policy can be initialized to be the number of streams requested by each MS of the plurality of MSs within the network. This can be expressed as: $d_{gk} = d_{gk}^{max}$, $\forall g \in \{1, \ldots, G\}$, $k \in \{1, \ldots, K\}$.

An application module 510 can be configured to determine whether it is feasible to use IA in the wireless network under consideration (referred to as the "second step" for purposes of explanation). For example, the application module 510 can be configured to perform a low complexity IA feasibility check. In this case, $v_{nj}^t$, $v_{gk}^r$, $n$, $g \in \{1, \ldots, G\}$, $j$, $k \in \{1, \ldots, K\}$ can be denoted as the number of freedoms. For example, the number of freedoms can be the free variables in precoder $V_{nj}^I$ and decorrelator $U_{gk}$, respectively. It is noted that the number of freedoms in $V_{nj}^I$ are given by the number of elements in $V_{nj}^F$ and that in $U_{gk}$ are given by the dimension of Grassmannian $G(d_{gk}, N_{gk}^r)$. This results in:

$$v_{nj}^t = d_{nj}\left(N_g^t - \sum_{k=1}^{K} d_{nk}\right), v_{gk}^r = d_{gk}(N_{gk}^r - d_{gk}).$$ Equation 19.

where $c_{gk,nj}$, n, $g\in\{1, \ldots, G\}$, $j\in\{1, \ldots, K\}$, $k\in\{1, \ldots, K\}$, is denoted as the number of constraints used to reduce (or nearly eliminate) the interference from $V_{nj}$ to $U_{gk}$. Set $$c_{gk,nj}=d_{nj}d_{gk}, \text{ if } g\neq n; c_{gk,nj}=0, \text{ otherwise.} \qquad \text{Equation 20.}$$

In an implementation, a low complexity IA feasibility-checking algorithm can be utilized by the application module 510 to determine if the network can benefit from IA and/or if IA can be applied to the network. If the network is IA feasible, let $d^*_{gk}=d_{gk}$, $g\in\{1, \ldots, G\}$, $k\in\{1, \ldots, K\}$ and no further action is taken (e.g., exit the algorithm).

If the network is not interference alignment feasible, update $d_{g'k'}=d_{g'k'}-1$ (referred to as the "third step" for purposes of explanation) and return to the second step, where (g',k') is given by:

$$(g', k') = \underset{g,k}{\operatorname{argmax}} \left( \sum_{n=1}^{G}\sum_{j=1}^{K}(c_{gk,nj} + c_{nj,gk} - c'_{gk,nj} - c'_{nj,gk}) - (v^t_{gk} + v^r_{gk} - v'^t_{gk} - v'^r_{gk}) \right) \qquad \text{Equation 21}$$

$$= \underset{g,k}{\operatorname{argmax}} \left( 2\sum_{n=1}^{G}\sum_{\substack{j=1\\(n,j)\neq(g,k)}}^{K} d_{nj} - (N^t_g + N^r_{gk} - 4d_{gk} + 2) \right).$$

where $\{v'^t_{gk}, v'^r_{gk}\}$, and $\{c'_{gk,nj}, c'_{nj,gk}\}$ denote the number of freedoms and constraints given by Equation 19 and Equation 20, respectively, with $d'_{gk}=d_{gk}=1$.

For purposes of explanation, the property of the low complexity IA feasibility checked applied by the application module 510 will be described. The IA feasibility constraint in Equation 9 is satisfied if, and only, if it can satisfy a low complexity IA feasibility checking. For example purposes, a low complexity IA feasibility checking approach will now be defined.

For notational convenience, $v_{nj}^t$, $v_{gk}^r$ and $c_{gk,nj}$ are denoted as $v_n^t$, $v_g^r$ and $c_{gn}$, respectively, where n=(n,j), g=(g,k), n, $g\in\{1, \ldots, G\}$, j, $k\in\{1, \ldots, K\}$.

The constraint assignment is initialed by randomly generalizing a constraint assignment policy, such as, for example, $\{c_{ng}^t, c_{gn}^r\}$ such that: $c_{ng}^t$, $c_{gn}^r \in N\cup\{0\}$, $c_{ng}^t + c_{gn}^r = c_{gn}$. Calculate $\{P_n^t, P_g^r\}$: $P_n^t=v_n^t-\Sigma_{g\in S}c_{ng}^t$, $P_g^r=v_g^r-\Sigma_{n\in S}c_{gn}^r$. Next, the constraint assignment is updated. For example, there can exist overloaded nodes (e.g., $P_n^t<0$ or $P_g^r<0$). In this case, the following is performed to update the constraint assignment $\{c_{gn}^t, c_{gn}^r\}$.

First, is initialization wherein an overloaded node with negative pressure is selected, without losing generality (referred to as Step A). For example, assume $P_n^t<0$, in this case $P_n^t$ is set to be the root node of the pressure transfer tree. The pressure transfer tree is a variation of the tree data structure, with its nodes storing the pressures at the precoders and decorrelators, its link strengths storing the maximum number of constraints that can be reallocated between the parent nodes and the child nodes.

Second, leaf nodes are added to the pressure transfer tree (referred to as Step B). For every leaf node $P_n^x$ ($x\in\{t,r\}$). For every g: If $c_{ng}^{\bar{x}}>0$, add $P_g^{\bar{x}}$ as a child node of $P_n^x$ with link strength $c_{ng}^x$, where $\bar{x}$ is the element in $\{t,r\}$ other than x.

Next, pressure is transferred from root to leaf nodes (referred to as Step C). For every leaf node with positive pressure, transfer pressure from root to these leafs by updating the constraint assignment policy $\{c_{gn}^t, c_{gn}^r\}$. For example, $$P_{n_1}^t \xrightarrow{c_{n_1 g_1}} P_{g_1}^r \xrightarrow{c_{g_1 n_2}} P_{n_2}^t$$

is a root-to-leaf branch of the tree. Update: $(c_{n_1 g_1}^t)'=c_{n_1 g_1}^t-\varepsilon$, $(c_{g_1 n_1}^r)'=c_{g_1 n_1}^r+\varepsilon$, $(c_{g_1 n_2}^r)'=c_{g_1 n_2}^r-\varepsilon$, $(c_{n_2 g_1}^t)'=c_{n_2 g_1}^t+\varepsilon$. This results in $(P_{n_1}^t)'=P_{n_1}^t-\varepsilon$ and $(P_{n_2}^t)'=P_{n_2}^t+\varepsilon$, where $\varepsilon=\min(-P_{n_1}^t, P_{n_2}^t, c_{n_1 g_1}^t, c_{g_1 n_2}^r)$.

Next, the depleted links and neutralized roots are removed (referred to as Step D). For example, if the strength of a link becomes zero (0) after the pressure is transferred as described above, separate the subtree rooted from the child node of this link from the original pressure transfer. In another example, if the root of a pressure transfer tree is nonnegative, remove the root and, therefore, the subtrees rooted from each child node of the root become new trees. This process is repeated until all roots are negative. For each newly generated pressure transfer tree, Steps B through D are repeated.

Conditions are exited (referred to as Step E). Steps A through D are repeated until all trees become empty (e.g., the network is IA feasible) or no new leaf node can be added for any of the non-empty trees in Step B (e.g., the network is IA infeasible). Exit the algorithm.

The worst-case complexity of the above described checking scheme is $O(G^3K^3)$, which is substantially lower compared with the complexity $O(2^{G^2K^2})$ in some IA feasibility checking techniques.

With continuing reference to FIG. 5, the first updater 504 can be configured to alternatively update the intermediate precoders $\{V_{nj}^I\}$ and the decorrelators $\{U_{gk}\}$. The updating by the first updater 504 can be performed to minimize the inter-cell interference 414. For example, $$\min_{V_{nj}^F \atop \neq n} \sum_{g=1}^{G}\sum_{k=1}^{K} \operatorname{trace}((U_{gk}H_{gk,n}V_{nj}^I)^H(U_{gk}H_{gk,n}V_{nj}^I)), \qquad \text{Equation 22.}$$

S.t.: equation (11), $$\min_{U_{gk} \atop \neq n} \sum_{g=1}^{G}\sum_{k=1}^{K} \operatorname{trace}((U_{gk}H_{gk,n}V_{nj}^I)^H(U_{gk}H_{gk,n}V_{nj}^I)), \qquad \text{Equation 23.}$$

S.t.: equation (12).

According to an alternative implementation for intra-cell interference suppression, the following is provided. Initialization can occur by randomly generating $V_{nj}^F$, $\forall n\in\{1, \ldots, G\}$, $j\in\{1, \ldots, K\}$ (referred to as step 1A for purposes of this description). Next, interference leakage can be minimized at the receiver side (referred to as step 2A for purposes of this description). For example, at the k-th MS of BS-g update $U_{gk}$: $u_{gk}(d)=(v_d[\Sigma_{n=1,\neq g}^{G}\Sigma_{j=1}^{K}P_{nj}(H_{gk,n}V_{nj}^I)(H_{gk,n}V_{nj}^I)^H])^H$, where $u_{gk}(d)$ is the d-th row of $U_{gk}$, $v_d[A]$ is the eigenvector corresponding to the d-th smallest eigenvalue of A, $d\in\{1, \ldots, d_{gk}\}$.

Further to this alternative implementation, interference leakage at the transmitter side can be minimized (referred to as step 3A for purposes of this detailed description). For example, at BS-n, update $V_{nj}^F$, $j\in\{1, \ldots, K\}$: $V_{nj}^F=-(S_n^H Q_{nj}S_n)^{-1}S_n^H Q_{nj}V_{nj}^C$, where $Q_{nj}=\Sigma_{g=1,\neq n}^{G}\Sigma_{k=1}^{K}P_{nj}(U_{gk}H_{gk,n})^H(U_{gk}H_{gk,n})$.

Steps 2A and 3A, described above, can be repeated until $V_{nj}^F$ and $U_{gk}$ converges. Set $V_{nj}^{I*}=V_{nj}^C+S_n V_{nj}^F$ and $U_{gk}^*=U_{gk}$.

For fully connected MIMO cellular network with i.i.d. channel matrices $\{H_{gk,n}\}$, the alternative implementation described above converges to a local optimal solution as derived by the second updater 506. It should be noted, however, that global optimality might not be achieved, nor is it guaranteed.

The following discusses the rank property of the conversed solution of the above noted alternative implementation in the direct links. As it relates to the property of $[V_{nj}^{I*}]$ and $[U^*_{nj}]$), for a fully connected MIMO cellular network with i.i.d. channel matrices $\{H_{gk,n}\}$, the converged solution of the alternative intra-cell interference suppression discussed above, $\{V_{nj}^{I*}\}, U^*_{nj}, n \in \{1, \ldots, G\}, j \in \{1, \ldots, K\}$ satisfy $$\text{rank}\left(\begin{bmatrix}(U_{n1}^*)^H H_{n1,n}\\(U_{n2}^*)^H H_{n2,n}\\ \ldots \\(U_{nK}^*)^H H_{nK,n}\end{bmatrix}[V_{n1}^{I*}, V_{n2}^{I*}, \ldots, V_{nK}^{I*}]\right) = \sum_{j=1}^{K} d_{nj},$$

Equation 24.

$\forall n \in \{1, \ldots, G\}$

With continuing reference to FIG. 5, the second updater 506 can perform intra-cell interference suppression through utilization of the following constructive algorithm, referred to as intra-cell zero forcing. Denote $\overline{W}_q = [W_1^H, \ldots, W_{q-1}^H, W_{q+1}^H, \ldots, W_K^H, W_q^H]^H$, where $W_q = (U^*_{nq})H_{nq,n}$, $q \in \{1, \ldots, K\}$. Each BS can perform the following for every $q \in \{1, \ldots, K\}$ to calculate the precoders. At a first step, LQ decomposition is performed for $\overline{W}_q[V_{n1}^{I*}, V_{n2}^{I*}, \ldots, V_{nK}^{I*}] = L_n(q)Q_n(q)$, where $Q_n(q)$ is an $\sum_{j=1}^{K}d_{nj} \times \sum_{j=1}^{K}d_{nj}$ unitary matrix, and $L_n(q)$ is a $\sum_{j=1}^{K}d_{nj} \times \sum_{j=1}^{K}d_{nj}$, lower triangular matrix.

At a second step, set $V'_{nq} = [V_{n1}^{I*}, V_{n2}^{I*}, \ldots, V_{nK}^{I*}]Q'_n(q)$, where $Q'_n(q)$ is a matrix aggregated by the last $d_{nq}$ columns of $Q_n^H(q)$. At a third step, singular value decomposition is performed for $V'_{nq} = A_{nq}S_{nq}B_{nq}^H$, where $S_{nq}$ is a $N_g^t \times d_{nq}$ matrix, $A_{nq}$ and $B_{nq}$ are $N_g^t \times N_g^t$ and $d_{nq} \times d_{nq}$ matrices, respectively. Set $V^*_{nq} = A'_{nq}$, where $A'_{nq}$ is a matrix aggregated by the first $d_{nq}$ columns of $A_{nq}$.

Another aspect relates to optimizing $\{V^*_{nj}\}$ for fully connected MIMO cellular networks with i.i.d. channel matrices $\{H_{gk,n}\}$, the output of the intra-cell zero-forcing $\{V^*_{nj}\}, n \in \{1, \ldots, G\}, j \in \{1, \ldots, K\}$, can be the best solution derived by the second updater 506 (e.g., with optimal value (intra-cell interference power)=0).

As it relates to MIMO cellular networks with partial connectivity, there can be space restriction on transceivers. For example, in point-to-point MIMO or single BS MIMO cellular networks, partial connectivity can be harmful to system performance. However, as discussed herein, partial connectivity can be beneficial to system performance in MIMO interference networks since partial connectivity provides an extra dimension of freedom, namely the interference nulling to eliminate interference. For example, by restricting transceivers to lower dimensional subspaces in partially connected MIMO interference networks, many IA constraints can be eliminated (or substantially reduced) at a cost of only a few freedoms in transceiver design and, therefore, the IA feasibility region is extended.

In an example, the subspace constraint can be extended to exploit the partial connectivity in MIMO networks and a transceiver structure will be described. Provided is an intermediate precoder with dynamic free space: $V_{nj}^I = V_{nj}^C + S_{nj}^t V_{nj}^F$, and a decorrelator with dynamic linear filter: $U_{nj} = U_{nj}^F S_{nj}^r$, where $S_{nj}^t \in C^{N_n^t \times s_{nj}^t}$, $V_{nj}^F \in C^{S_{nj}^t \times d_{nj}}$, $S_{nj}^r \in C^{(d_{nj}+s_{nj}^r) \times N_{nj}^r}$, $U_{nj}^F \in C^{d_{nj} \times (d_{nj}+s_{nj}^r)}$, $S_{nj}^t \in \{0, 1, \ldots N_n^t - \sum_{k=1}^K d_{nj}\}$, $S_{nj}^r \in \{0, 1, \ldots N_{nj}^r - d_{nj}\}$.

There can also be a space restriction via new transceiver structures. It is noted that $\text{span}_c(V_{nj}^t) \subseteq \text{cspan}_c(V_{nj}^C) + \text{span}_c(S_{nj}^t)$, and $\text{span}_r(U_{nj}) \subseteq \text{span}_r(S_{nj}^r)$, space restriction is imposed on $V_{nj}^I$ and $U_{nj}$ by the new transceiver structure. As a special case, when $S_{nj}^t = N_n^t - \sum_{k=1}^K d_{nj}, S_{nj}^r = N_{nj}^r - d_{nj}$, the transceiver structure is reduced as compared to the transceiver structure described above.

As it relates to MIMO cellular networks with partial connectivity, the IA for MIMO Cellular Networks (e.g., Equations 2 through 5), can be decomposed into three sections. The data stream assignment is modified as per the following.

For the stream assignment and subspaces design, $$\max_{\{d_{nj}\},\{V_{nj}^C\},\{S_{nj}^t\},\{S_{nj}^r\}} \sum_{n=1}^{G}\sum_{j=1}^{K} d_{nj}.$$

Equation 25

S.t. $\sum_{\substack{(g,k) \in S_U, \\ (n,j) \in S_V, g \neq n}} \min(d_{gk} | \text{span}_r(S_{gk}^r) \cap (N'(H_{gk,n}))^\perp)$ Equation 26

$\min(d_{nj} | \text{span}_c(V_{nj}^C) + \text{span}_c(V_{nj}^t)) \cap$ $(N'(H_{gk,n}))^\perp \leq \sum_{(n,j) \in S_V} d_{nj}S_{nj}^t + \sum_{(g,k) \in S_U} d_{gk}S_{nj}^r,$ $\forall S_V, S_U \subseteq S,$ where $S = \{(g, k): g \in \{1, \ldots, G\}, k \in \{1, \ldots, K\}\}$.

$[V_{n1}^C, V_{n2}^C, \ldots, V_{nK}^C, S_{nj}^t]^H [V_{n1}^C, V_{n2}^C, \ldots, V_{nK}^C, S_{nj}^t] = I,$ $V_{nj}^C \in (N(H_{nj,n}))^\perp,$ Equation 27.

$S_{nj}^r(S_{nj}^r)^H = I, S_{nj}^r \in (N'(H_{nj,n}))^\perp,$ $\forall n \in \{1, \ldots, G\}, j \in \{1, \ldots, K\}.$ Equation 28.

As it relates to the suppression performed by the first updater 504 and the second updater 506 for a MIMO network with partial connectivity, the equations are substantially the same except that, $V_{nj}^C, S_n,$ and $U_{nj}$ are replaced with $V_{nj}^{C*}, S_{nj}^{T*},$ and $U_{nj}^F S_{nj}^{R*}$, respectively, where $\{V_{nj}^{C*}\}, \{S_{nj}^{T*}\},$ and $\{S_{nj}^{R*}\}$ are the solutions to the above stream assignment and subspaces design (e.g., Equations 25 through 28).

To appreciate the disclosed aspects, the following provides a connection between an initial IA solution and the IA solution decomposed by the allocation module 502, the first updater 504, and the second updater 506 as it relates to a partially connected MIMO networks. For partially connected MIMO cellular networks, with probability 1, the solutions of the stream assignment and subspaces design determination and the interference suppressions, for example, $\{d^*_{gk}\}, \{U^*_{gk}\}, \{V^*_{gk}\}$, are also a valid solution of the IA for MIMO cellular networks (e.g., Equations 2 through 5). Therefore, the performance of the decomposed problems, for example, $\sum_{g=1}^G \sum_{k=1}^K d^*_{gk}$ gives a lower bound of that of the original problem.

In an implementation, the greedy-based algorithm can be extended to the partial connectivity situation, which is now described with reference to Steps 1 through 6. In this case, at Step 1, the number of streams is initialized as $d_{nj} = \min(\text{rank}(H_{nj,n}), d_{nj}^{max}), \forall n \in \{1, \ldots, G\}, j \in \{1, \ldots, K\}$.

At Step 2, the common null spaces are calculated. At each BS $n \in \{1, \ldots, G\}$, calculate the intersection of the null spaces of the inter-cell cross links, for example, $N_n(M) = \cap_{(g,k) \in M} N(H_{gk,n})$, $M \subseteq \{(g,k): g \neq n \in \{1, \ldots, G\}, k \in \{1, \ldots, K\}\}$, as follows:

First, denote $M_n = \{(g,k): H_{nm} \neq 0\}$. Initialize $N_n(\emptyset) = \mathbb{C}^{N_n^t}$, $N_n(\{(g,k)\}) = N_n(H_{gk,n})$, and set the cardinality parameter $C=2$.

Second, for every $M \subseteq M_n$ with $|M|=C$, if all the subsets of $M$ with cardinality $(C-1)$ are not $\{0\}$, calculate $N_n(M) = N_n(M \backslash \{(g',k')\}) \cap N(\{(g',k')\})$, where $(g', k')$ is an arbitrary element in $K_{sub}$. Update $C = C+1$. Repeat this process until $N(M) = \{0\}$, $\forall M \subseteq M_n$ with $|M|=C$ or $C = |M_n|$.

Third, for every $M \subseteq M_n$ with $N_n(M) \neq \{0\}$, set $N_n(M \cup (\{1, \ldots, K\} \backslash M_n)) = N_n(M)$ Then, at each MS $M_{gk}$, calculate $N_{gk}^r(M') = \cap_{n \in M'} N(H_{gk,n})$, $M' \subseteq \{n: n \neq g \in \{1, \ldots, G\}\}$ using a similar process.

At Step 3, Design $V_{nj}^C$ (e.g., $\text{span}_c(V_{nj}^C)$): At BS $n$, $n \in \{1, \ldots, G\}$, design $V_{nj}^C$, $j \in \{1, \ldots, K\}$ one by one as follows: For the j-th MS of BS-n, First, update the number of streams assigned to the j-th MS of BS-n if there is not enough signal dimension left, for example, update $d_{nj} = \min(d_{nj}, N_g^t - \dim((+_{k<j} V_{nk}^C) + N(H_{nj})))$;

Then, design $V_{nj}^C$ based on the principles that A) $V_{nj}^C$ is orthogonal to the previous designed core spaces and is contained by the effective subspace of the direct link, for example, $V_{nj}^C \subseteq ((+_{k<j} V_{nk}^C) + N(H_{nj}))^\perp$; B) A subspace which belongs to a null space $N(M)$ with larger weight (e.g., $W_n(N(M))$, defined below) is selected with higher priority.

$$W_n(N(M)) = \sum_{(g,k) \in M} \min(d_{gk}, \text{rank}(H_{gk,n})). \quad \text{Equation 29}$$

From the left side of Equation 26, this weight is the maximum number of IA constraints that can be mitigated by selecting a one dimensional subspace in $N(M)$.

At Step 4, Design $S_{nj}^t$ and $S_{gk}^r$ (e.g., $\text{span}_c(S_{nj}^r)$, $\text{span}_r(S_{gk}^r)$):

At BS $n$, $n \in \{1, \ldots, G\}$, design $\{S_{nj}^t\}$:

A. Generate a series of potential $S_{nj}^t(d)$, $d \in \{0, 1, \ldots, N_g^t - \Sigma_{k=1}^K d_{nk}\}$ with $\dim(S_{nj}^t(d)) = d$ based on the principles that A) $S_{nj}^t \subseteq ((+_{k \in \{1, \ldots, K\}} V_{nk}^C))^\perp$, B). Similar to the principle B in Step 3.

B. Choose the best possible $S_{nj}^t$: Set $S_{nj}^t = S_{nj}^t(d^*)$, where $$d^* = \arg\max_d \begin{pmatrix} d_{nj} d - \sum_{g=1, \neq n}^{G} \sum_{k=1}^{K} \min(d_{gk}, \text{rank}(H_{gk,n})) \times \\ \min(d_{nj}, |(V_{nj}^C + S_{nj}^t(d)) \cap (N_{gk,n}^t)^\perp|) - \end{pmatrix} \quad \text{Equation 30.}$$

In a similar manner, at each MS $M_{gk}$, generate $S_{nj}^r(d)$, $d \in \{0, 1, \ldots, N_{gk}^r - d_{gk}\}$ based on principle B. Set $S_{gk}^r = S_{gk}^r(d^*)$, where $$d^* = \quad \text{Equation 31.}$$

$$\arg\max_d \begin{pmatrix} d_{gk} d - \sum_{n=1, \neq g}^{G} \sum_{j=1}^{K} \min(d_{gk}, |S_{gk}^r \cap (N_{gk,n}^r)^\perp|) \times \\ \min(d_{nj}, |(V_{nj}^C + S_{nj}^t(d)) \cap N(H_{gk,n})^\perp|) - \end{pmatrix}$$

Feasibility checking is performed at Step 5. In this case, set $v_{nj}^t = d_{nj} S_{nj}^t$, $v_{gk}^r = d_{gk} S_{gk}^r$, where $S_{nj}^t$ and $S_{gk}^r$ are defined above with respect to the transceiver structure to exploit partial connectivity. Set $c_{gk,nj} = \min(d_{gk}, |\text{span}_r(S_{gk}^r) \cap N(H_{gk,n})^\perp|) \min(d_{nj}, |(\text{span}_c(V_{nj}^C) + \text{span}_c(S_{nj}^t)) \cap N(H_{gk,n})^\perp|)$, if $g \neq n$; $C_{gk,nj} = 0$, otherwise. Use a low complexity algorithm to check if the network is IA feasible (e.g., the low complexity algorithm discussed above). If the network is not IA feasible, go to Step 6. Otherwise, set $d^*_{nj} = d_{nj}$, and set $V_{nj}^{C*}$, $S_{nj}^{t*}$, $S_{nj}^{r*}$ to be matrices aggregated by the basis vectors of $V_{nj}^C$ and $S_{nj}^t$, $S_{nj}^r$, respectively, $\forall n \in \{1, \ldots, G\}$, $j \in \{1, \ldots, K\}$. Exit the algorithm.

At Step 6, the stream assignment is updated. Update $d_{g'k'} = d_{g'k'} - 1$ and go back to Step 2, where $(g',k')$ is given by (the first line of) Equation 21.

As it relates to the subspace design criterion in the above greedy-based solution for the partially connected case, similar to the stream assignment criteria (e.g., Equation 21), the core space $\{V_{nj}^C\}$ and free space $\{S_{nj}^r\}$ should be designed to alleviate the IA feasibility constraint as much as possible in order to enhance the network DoF. Therefore, both Equation 29 and Equation 30 can be designed to maximize the difference between the number of freedoms in intermediate precoder design minus the number of inter-cell IA constraints.

In an example, the above described greedy-based solution for the partially connected case is a backward compatible extension of the greedy stream assignment discussed earlier in this detailed description. When the network is fully connected (e.g., Steps 2 to 4 in the partially connected greedy-based solution), $\{V_{nj}^C\}$, $\{S_{nj}^t\}$, and $\{S_{nj}^r\}$ will be generated with $S_{nj}^t = S_n$, $\forall j \in \{1, \ldots, K\}\}$ and $\text{rank}(S_{nj}^r) = N_{nj}^r$. However, according to an aspect, this particular choice of the core space might not offer any additional DoF gain compared to other choices of $\{V_{nj}^I\}$ and $\{S_n\}$ satisfying constraint (e.g., Equation 13) in the fully connected case.

To avoid redundancy, the solutions to the interference suppression algorithms are similar to those discussed above with respect to the fully connected case and, therefore, will not be repeated.

According to an implementation, partial connectivity can be determined as follows. If the channel gain of an eigenchannel is below a sufficiently small threshold, the channel gain can be quantized as zero and the channel can be defined as partially connected. For example, the maximum transmit power of BSs is $P_{max}$ and the power of the Gaussian noise is $\sigma$. Set the threshold to be $$\rho = \frac{\sigma}{10 P_{max}}.$$

When the gain of the eigenchannel $g \leq \rho$, the power of interference on this channel is no more than $$\rho P_{max} = \frac{\sigma}{10},$$

which is negligible compared to the Gaussian noise. Therefore, $g$ can be quantized to be zero (0) and the eigenchannel can be defined as partially connected.

In view of the example systems shown and described herein, methods that may be implemented in accordance with the one or more of the disclosed aspects, will be better understood with reference to the following flow charts.

While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 6:
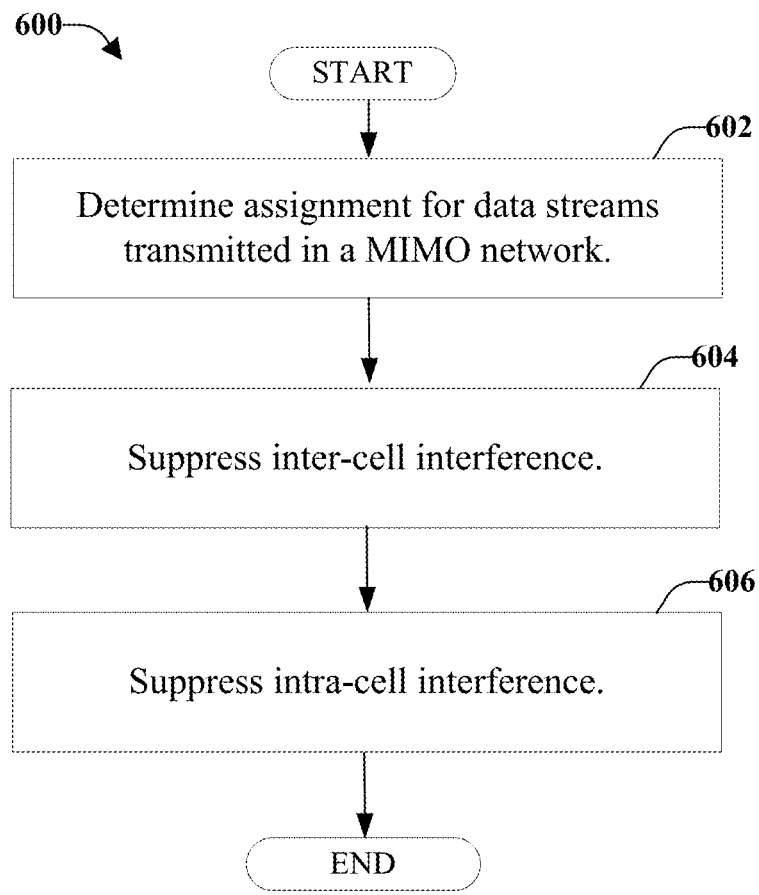
FIG. 6 is an example, non-limiting method for interference alignment of partially connected multiple-input multiple-output cellular networks, according to an aspect.

FIG. 6 is an example, non-limiting method 600 for interference alignment of partially connected MIMO cellular networks, according to an aspect. At 602, assignments for data streams transmitted by one or more devices in a multiple-input multiple-output network are determined. Determining the assignments can include maximizing a sum of a function of the data streams of the MIMO network. In an implementation, the MIMO network comprises three or more cells.

At 604, inter-cell interference is suppressed. Further, at 606, intra-cell interference is suppressed. For example, suppressing inter-cell interference comprises updating intermediate precoders and decorrelators and the suppressing intra-cell interference comprises further adjusting the intermediate precoders.

Figure 7:
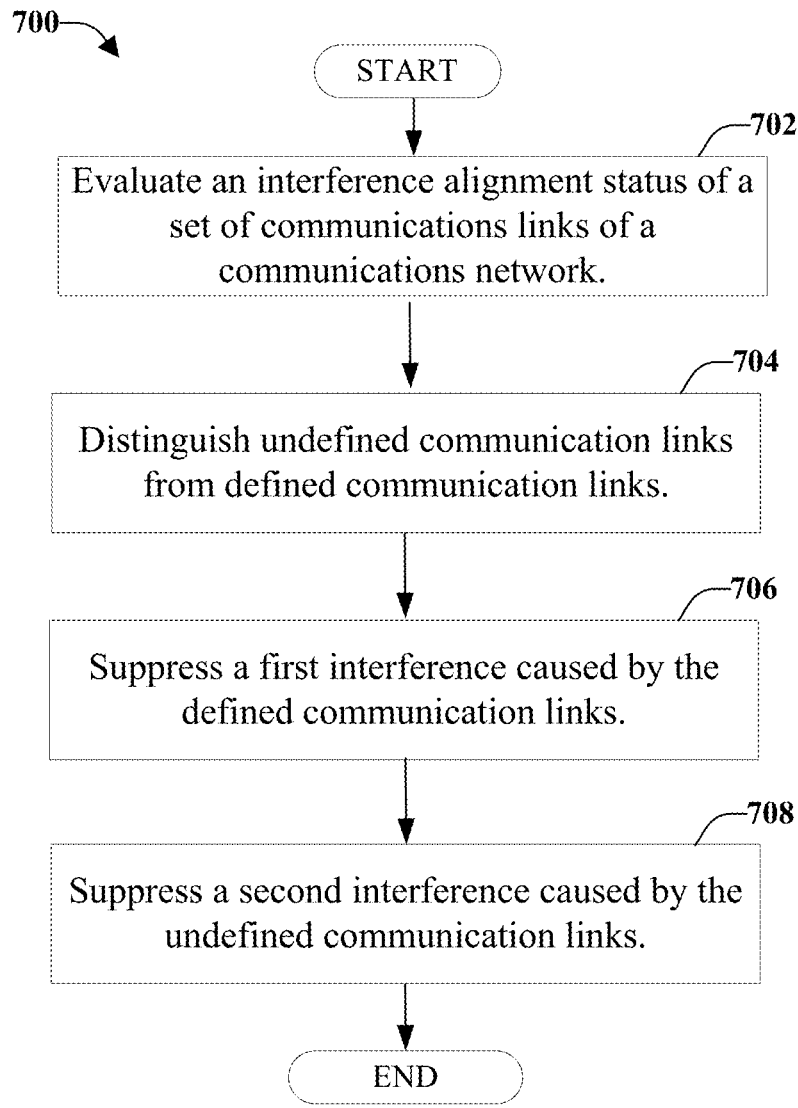
FIG. 7 illustrates an example, non-limiting embodiment of a method for mitigation of interference in a communications network.

FIG. 7 illustrates an example, non-limiting embodiment of a method 700 for mitigation of interference in a communications network. At 702, an interference alignment status of a set of communication links of a communications network is evaluated. The set of communication links can include defined communication links and undefined communication links. The undefined communication links are undesired communication links (e.g., inter-cell links). The defined communication links are desired communication links (e.g., intra-cell links). At 704, the defined communication links are distinguished from the undefined communication links.

According to an implementation, the communications network is a multiple-input multiple-output communications network comprising an arbitrary number of cells, users, and antennas. In an example, the communications network can comprise three or more cells, however, the disclosed aspects are not limited to this implementation.

In accordance with an implementation, the evaluating can include determining a network device of the communications network is configured to operate with the application of interference alignment (e.g., IA feasibility). According to another implementation, the evaluating can include determining assignments for a first set of data streams of the undefined communication links and a second set of data streams of the defined communication links. Further to this implementation, the method can include maximizing a degree of freedom of a network device of the communications network.

At 706, a first interference caused by the defined communication links is suppressed. In an implementation, suppressing the first interference caused by the defined communication links comprises suppressing the first interference on a per cell basis. A second interference caused by the undefined communication links is suppressed, at 708. The second interference is different from the first interference. In accordance with an implementation, suppressing the first interference can include updating intermediate precoders and decorrelators and suppressing the second interference can include adjusting the intermediate precoders after the updating (e.g., a second adjustment).

In accordance with some aspects, the method includes initializing a stream assignment policy comprising setting the stream assignment policy to be a number of streams requested by each mobile device communicating in the network devices of the communications network. Further to this aspect, the method includes determining a practicability of interference alignment within the communications network. According to an implementation, the method can also include concurrently zero forcing the first interference and the second interference.

Figure 8:
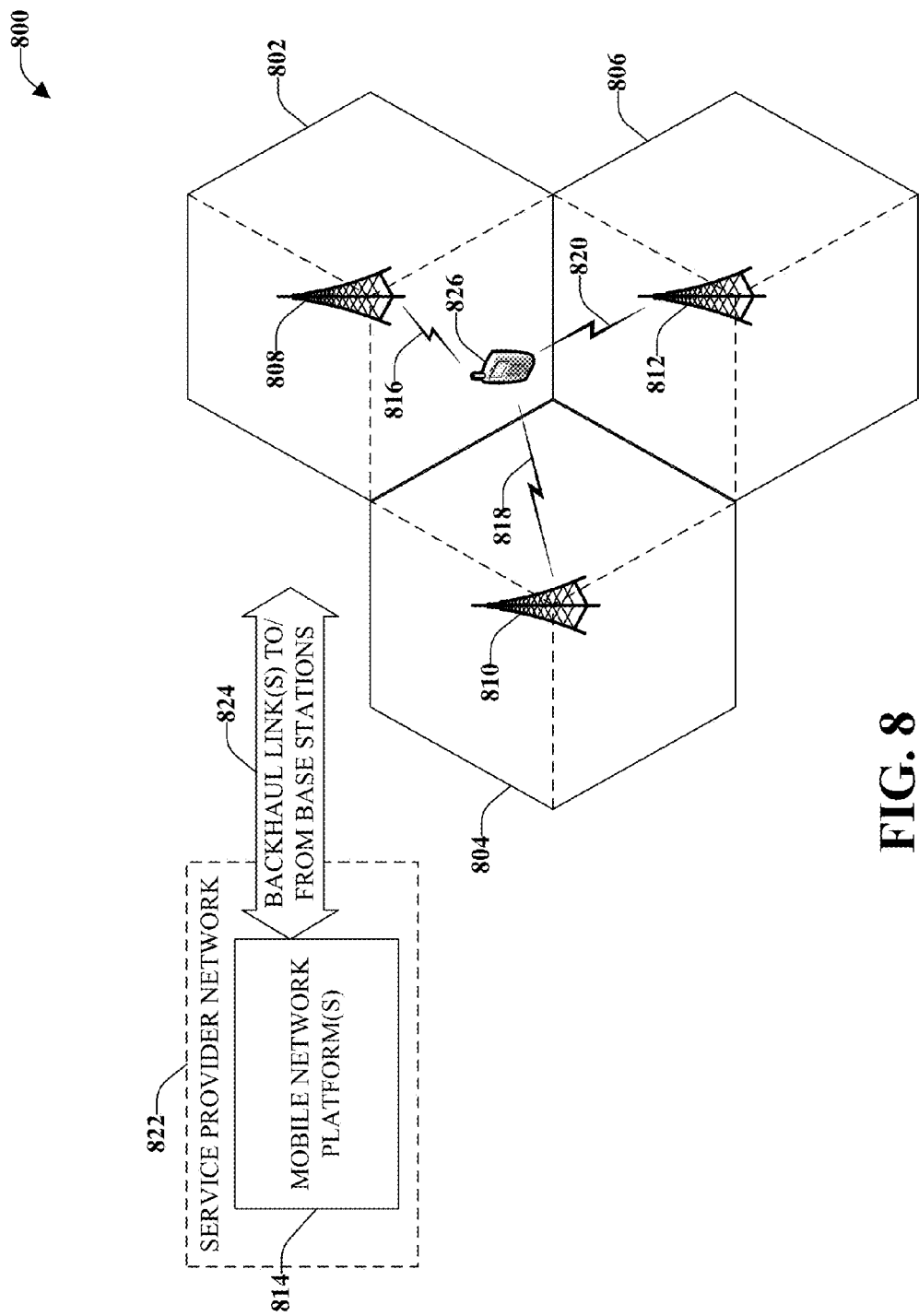
FIG. 8 is a schematic example communications environment that can operate in accordance with aspects described herein.

By way of further description with respect to one or more non-limiting ways to facilitate interference mitigation in partially connected MIMO networks, FIG. 8 is a schematic example communications environment 800 that can operate in accordance with aspects described herein. In particular, example wireless environment 800 illustrates a set of wireless network macro cells. Three coverage macro cells 802, 804, and 806 include the illustrative wireless environment; however, it is noted that wireless cellular network deployments can encompass any number of macro cells. Coverage macro cells 802, 804, and 806 are illustrated as hexagons; however, coverage cells can adopt other geometries generally dictated by a deployment configuration or floor plan, geographic areas to be covered, and so on. Each macro cell 802, 804, and 806 is sectorized in a $2\pi/3$ configuration in which each macro cell includes three sectors, demarcated with dashed lines in FIG. 8. It is noted that other sectorizations are possible, and aspects or features of the disclosed subject matter can be exploited regardless of type of sectorization. Macro cells 802, 804, and 806 are served respectively through base stations or eNodeBs 808, 810, and 812. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 814, and set of base stations (e.g., eNode B 808, 810, and 812) that serve a set of macro cells; electronic circuitry or components associated with the base stations in the set of base stations; a set of respective wireless links (e.g., links 816, 818, and 820) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 816, 818, and 820 embody a Uu interface (universal mobile telecommunication system Air Interface).

Mobile network platform(s) 814 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 822 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 814 can control and manage base stations 808, 810, and 812 and radio component(s) associated thereof, in disparate macro cells 802, 804, and 806 by way of, for example, a wireless network management component (e.g., radio network controller(s), cellular gateway node(s), etc.) Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 814 can be embodied in the service provider network 822.

In addition, wireless backhaul link(s) 824 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 824 embodies IuB interface.

It is noted that while exemplary wireless environment 800 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 9:
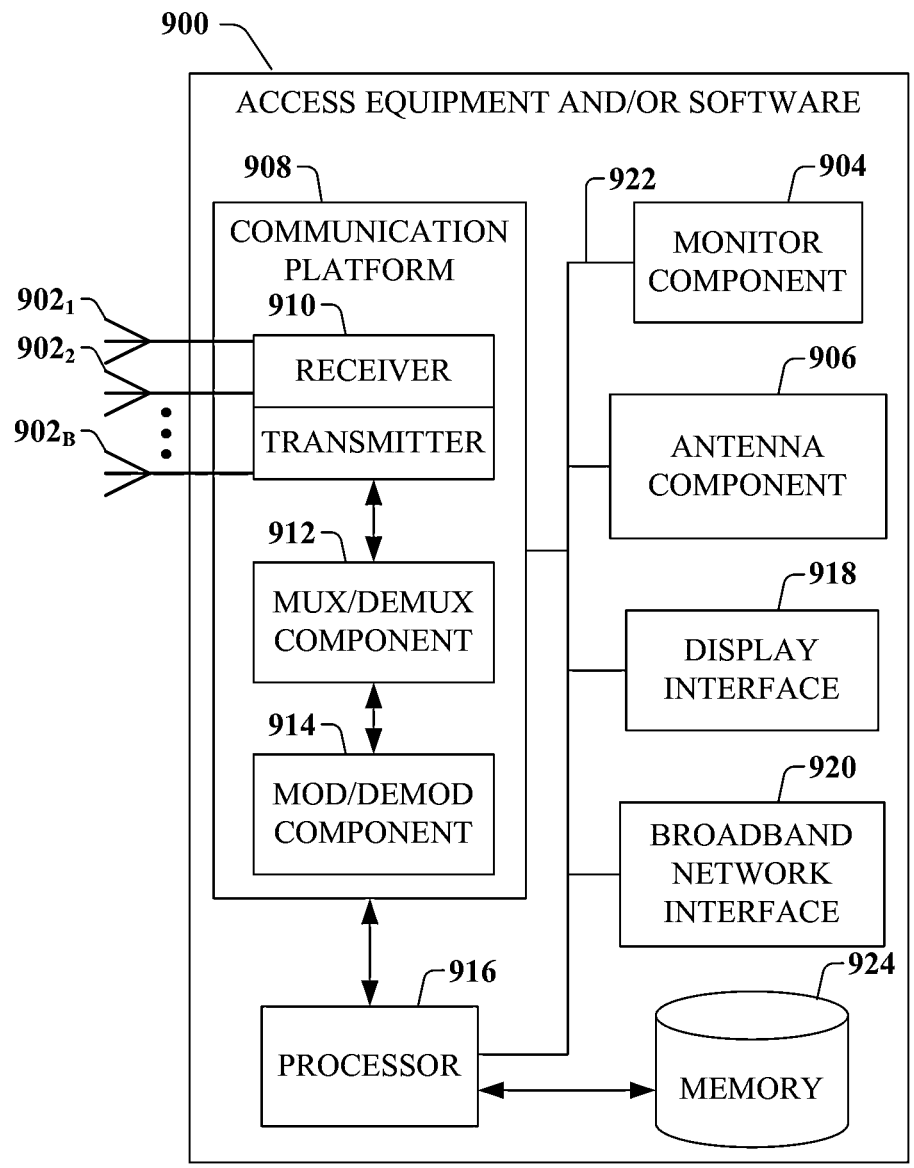
FIG. 9 illustrates a block diagram of access equipment and/or software related to access of a communications network, in accordance with an embodiment.

To provide further context for various aspects of the disclosed subject matter, FIG. 9 illustrates a block diagram of an embodiment of access equipment and/or software 900 related to access of a network (e.g., base station, wireless access point, femtocell access point, and so forth) that can enable and/or exploit features or aspects of the disclosed aspects.

Access equipment and/or software 900 related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software 900 related to access of a network, and can be controlled by a monitor component 904 and an antenna component 906. Monitor component 904 and antenna component 906 can couple to communication platform 908, which can include electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 can be a multiplexer/demultiplexer 912 that can facilitate manipulation of signals in time and frequency space. Multiplexer/demultiplexer 912 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation, with M a positive integer); phase-shift keying; and so forth).

Access equipment and/or software 900 related to access of a network also includes a processor 916 configured to confer, at least in part, functionality to substantially any electronic component in access equipment and/or software 900. In particular, processor 916 can facilitate configuration of access equipment and/or software 900 through, for example, monitor component 904, antenna component 906, and one or more components therein. Additionally, access equipment and/or software 900 can include display interface 918, which can display functions that control functionality of access equipment and/or software 900, or reveal operation conditions thereof. In addition, display interface 918 can include a screen to convey information to an end user. In an aspect, display interface 918 can be a liquid crystal display, a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software 900 to receive external commands (e.g., restart operation).

Broadband network interface 920 facilitates connection of access equipment and/or software 900 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 920 can be internal or external to access equipment and/or software 900, and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software 900, memory 924 can retain location and/or coverage area (e.g., macro sector, identifier(s)), access list(s) that authorize access to wireless coverage through access equipment and/or software 900, sector intelligence that can include ranking of coverage areas in the wireless environment of access equipment and/or software 900, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus), to memory 924 in order to store and retrieve information used to operate and/or confer functionality to the components, platform, and interface that reside within access equipment and/or software 900.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 924, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 10:
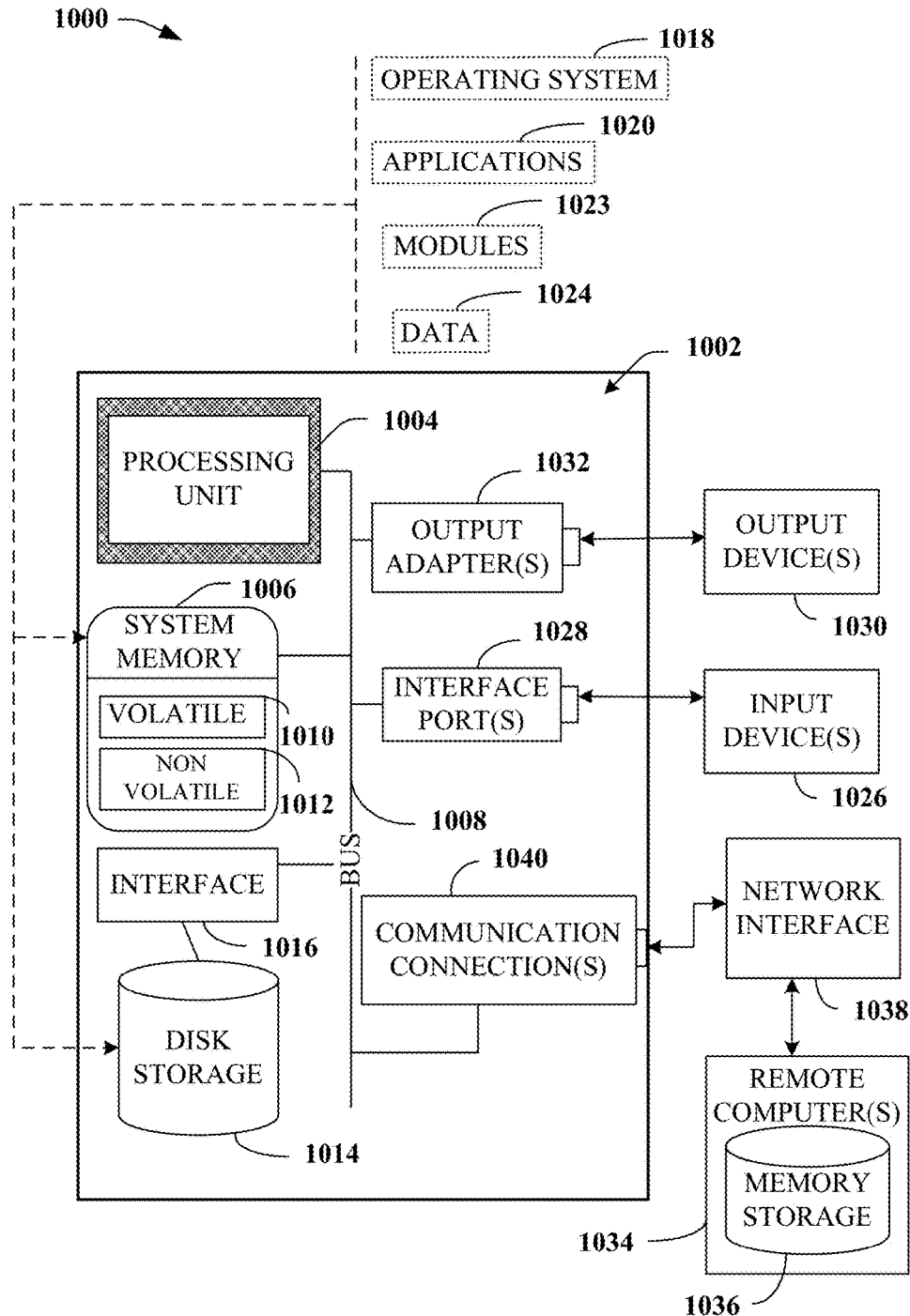
FIG. 10 illustrates a block diagram of a computing system, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 404) there can be software, which can instruct a processor (such as processor 406) to perform various actions. The processor can be configured to execute the instructions in order to implement the analysis of determining assignments for data streams transmitted to one or more devices, suppressing inter-cell interference, and/or suppressing intra-cell interference.

Moreover, those skilled in the art will understand that the various aspects can be practiced with other computer system configurations, including single-processor or multiprocessor computer systems, mini-computing devices, mainframe computers, as well as personal computers, base stations, hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1002 includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 1006 includes volatile memory 1010 and nonvolatile memory 1012. A basic input/output system, containing routines to transfer information between elements within computer 1002, such as during start-up, can be stored in nonvolatile memory 1012. By way of illustration, and not limitation, nonvolatile memory 1012 can include read only memory, programmable read only memory, electrically programmable read only memory, electrically erasable programmable read only memory, or flash memory. Volatile memory 1010 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1002 also includes removable/non-removable, volatile/non-volatile computer storage media. In an implementation, provided is a non-transitory or tangible computer-readable medium storing computer-executable instructions that, in response to execution, cause a system comprising a processor to perform operations. The operations can include determining assignments for data streams transmitted by one or more devices in a multiple-input multiple-output communications network. The operations can also include suppressing inter-cell interference and suppressing intra-cell interference. According to an aspect, suppressing intra-cell interference comprises suppressing the intra-cell interference on a per cell basis.

In an implementation, determining the assignments can comprise maximizing a sum of a function applied to the data streams. In another implementation, determining the assignments can comprise initializing a stream assignment policy and determining whether interference alignment is applicable to the data streams based on the stream assignment policy.

According to an implementation, the initializing comprises setting the stream assignment policy for a mobile device in communication with the multiple-input multiple-output network to be a number of data streams requested by the mobile device.

Suppressing the inter-cell interference can include updating intermediate precoders and decorrelators, according to an aspect. According to another aspect, suppressing the inter-cell interference can include updating intermediate precoders and decorrelators and suppressing intra-cell interference can include further adjusting the intermediate precoders.

According to an implementation, the one or more devices of the multiple-input multiple-output network comprise a combination of cells, user devices, and antennas. In some implementations, the one or more devices of the multiple-input multiple-output network comprise a three or more cells. In a further implementation, the operations can include zero forcing the inter-cell interference and the intra-cell interference.

FIG. 10 illustrates, for example, disk storage 1014. Disk storage 1014 includes, but is not limited to, devices such as a magnetic disk drive, floppy disk drive, tape drive, Jaz drive, Zip drive, superdisk drive, flash memory card, or memory stick. In addition, disk storage 1014 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1014 to system bus 1008, a removable or non-removable interface can be used, such as interface component 1016.

It is to be noted that FIG. 10 describes software that acts as an intermediary between users and computer resources described in a suitable operating environment. Such software includes an operating system 1018. Operating system 1018, which can be stored on disk storage 1014, acts to control and allocate resources of computer system 1002. System applications 1020 can take advantage of the management of resources by operating system 1018 through program modules 1022 and program data 1024 stored either in system memory 1006 or on disk storage 1014. It is to be understood that the disclosed subject matter can be implemented with various operating systems or combinations of operating systems.

A user can enter commands or information, for example through interface component 1016, into computer system 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1004 through system bus 1008 through interface port(s) 1028. Interface port(s) 1028 include, for example, a serial port, a parallel port, a game port, and a universal serial bus. Output device(s) 1030 use some of the same type of ports as input device(s) 1026.

Thus, for example, a universal serial bus port can be used to provide input to computer 1002 and to output information from computer 1002 to an output device 1030. Output adapter 1032 is provided to illustrate that there are some output devices 1030, such as monitors, speakers, and printers, among other output devices 1030, which use special adapters. Output adapters 1032 include, by way of illustration and not limitation, video and sound cards that provide means of connection between output device 1030 and system bus 1008. It is also noted that other devices and/or systems of devices provide both input and output capabilities such as remote computer(s) 1034.

Computer 1002 can operate in a networked environment using logical connections to one or more remote computers, such as remote computer(s) 1034. Remote computer(s) 1034 can be a personal computer, a server, a router, a network computer, a workstation, a microprocessor based appliance, a peer device, or other common network node and the like, and can include many or all of the elements described relative to computer 1002.

For purposes of brevity, only one memory storage device 1036 is illustrated with remote computer(s) 1034. Remote computer(s) 1034 is logically connected to computer 1002 through a network interface 1038 and then physically connected through communication connection 1040. Network interface 1038 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks such as integrated services digital networks and variations thereon, packet switching networks, and digital subscriber lines.

Communication connection(s) 1040 refer(s) to hardware/software employed to connect network interface 1038 to system bus 1008. While communication connection 1040 is shown for illustrative clarity inside computer 1002, it can also be external to computer 1002. The hardware/software for connection to network interface 1038 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, and/or long term evolution advanced. Additionally, substantially all aspects disclosed herein can be exploited in legacy telecommunication technologies, such as, for example, global system for mobile communication. In addition, mobile as well non-mobile networks (e.g., Internet, data service network such as Internet protocol television) can exploit aspects or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices can include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, for example, via access requests, queries or other data retrieval protocols, for a variety of operations with respect to the information stored by the medium.

Communications media can embody computer-readable instructions, data structures, program modules or other structured or unstructured data in a data signal such as a modulated data signal, for example, a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is noted that aspects or features of the disclosed embodiments can be exploited in substantially any wireless communication technology. Such wireless communication technologies can include universal mobile telecommunication system, code division multiple access, Wi-Fi, worldwide interoperability for microwave access, gateway general packet radio service, enhanced gateway general packet radio service, third generation partnership project long term evolution, third generation partnership project 2 ultra mobile broadband, high speed packet access, evolved high speed packet access, high-speed downlink packet access, high-speed uplink packet access, Zigbee, or another IEEE 802.XX technology. Additionally, substantially all aspects disclosed herein can be exploited in legacy telecommunication technologies.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, and drawings, such terms are intended to be inclusive in a manner similar to the term "comprising" as "comprising" is interpreted when employed as a transitional word in a claim.

As used in this application, the terms "component", "system", and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
a memory to store instructions; and
a processor, communicatively coupled to the memory, that facilitates execution of the instructions to perform operations, comprising:
determining a respective assignment of each of a plurality of data streams transmitted to one or more devices in a multiple-input multiple-output cellular network having partial connectivity resulting from heterogeneous path losses between a base station device and a mobile device, wherein the determining the respective assignment of each of the plurality of data streams is based on interference alignment feasibility status information and a joint precoder and decorrelator design, wherein the interference alignment feasibility status information is determined based on a rank of a corresponding joint precoder and decorrelator design relative to a data stream of the plurality of data streams, and wherein a value of the corresponding joint precoder and decorrelator design is determined based on the rank; and
suppressing both inter-cell interference and intra-cell interference independent of multiple time slots or multiple frequency blocks.

2. The system of claim 1, wherein the determining the respective assignment of each of the plurality of data streams comprises maximizing a sum of a function applied to the plurality of data streams.

3. The system of claim 1, wherein the determining the respective assignment of each of the plurality of data streams comprises:
initializing a stream assignment policy; and
determining whether interference alignment is applicable to the plurality of data streams based on the stream assignment policy.

4. The system of claim 3, wherein the initializing comprises setting the stream assignment policy for a mobile device in communication with the multiple-input multiple-output cellular network to be a number of data streams requested by the mobile device.

5. The system of claim 1, wherein the suppressing the inter-cell interference comprises updating intermediate precoders and decorrelators.

6. The system of claim 1, wherein the suppressing the inter-cell interference comprises updating intermediate precoders and decorrelators and the suppressing intra-cell interference comprises further adjusting the intermediate precoders.

7. The system of claim 1, wherein the one or more devices of the multiple-input multiple-output cellular network comprise a combination of cells, user devices, and antennas.

8. The system of claim 1, wherein the one or more devices of the multiple-input multiple-output cellular network comprises three or more cells.

9. The system of claim 1, wherein the inter-cell interference and the intra-cell interference are produced by the transmitted data streams.

10. A method, comprising:
evaluating, by a system comprising a processor, a feasibility measurement of an interference alignment status of a set of communication links of a communications network experiencing quasi-static fading as a result of heterogeneous path losses between a base station device and a mobile device, wherein the set of communication links comprises a plurality of data streams carried on a mix of defined communication links and undefined communication links and wherein an interference alignment of the domain interference alignment status is determined to be of polynomial complexity;
distinguishing, by the system, the defined communication links from the undefined communication links based on the feasibility measurement, wherein the feasibility measurement is based on a rank of a corresponding joint precoder and decorrelator design for a communication link of the communication links, and wherein a value of the corresponding joint precoder and decorrelator design is based on the rank;
suppressing, by the system, a first interference caused by the defined communication links; and
suppressing, by the system, a second interference caused by the undefined communication links that is different from the first interference.

11. The method of claim 10, wherein the communications network is a multiple-input multiple-output communications network comprising an arbitrary number of cells, user devices, and antennas.

12. The method of claim 10, further comprising concurrently zero forcing, by the system, the first interference and the second interference.

13. The method of claim 10, where the suppressing the first interference caused by the defined communication links comprises suppressing the first interference on a per cell basis.

14. The method of claim 10, wherein the evaluating comprises determining a network device of the communications network is configured to operate with application of an interference alignment.

15. The method of claim 10, wherein the evaluating comprises determining assignments for a first set of data streams of the undefined communication links and a second set of data streams of the defined communication links, and wherein the first set of data streams comprise at least three data streams, and further comprising maximizing a degree of freedom of a network device of the communications network.

16. The method of claim 15, wherein the evaluating comprises:

initializing a stream assignment policy comprising setting the stream assignment policy to be a number of streams requested by each mobile device communicating with network devices of the communications network; and determining a practicability of interference alignment within the communications network.

17. The method of claim 15, wherein the suppressing the first interference comprises updating intermediate precoders and decorrelators and the suppressing the second interference comprises adjusting the intermediate precoders after the updating.

18. A method, comprising:

determining, by a system comprising a processor, a feasibility related to assignments for a plurality of data streams transmitted by devices in a multiple-input multiple-output mobile device network with heterogeneous path losses between a base station device and a mobile device, the determining comprising maximizing a sum of a function of the data streams of the multiple-input multiple-output mobile device network based on interference alignment for a plurality of nodes comprised in the multiple-input multiple-output mobile device network wherein the determining the feasibility comprises determining the feasibility based on a rank of a corresponding joint precoder and decorrelator design relative to a data stream of the plurality of data streams, and wherein a value of the corresponding joint precoder and decorrelator design is determined based on the rank;

suppressing inter-cell interference and suppressing intra-cell interference independent of multiple time slots or multiple frequency blocks, wherein the multiple-input multiple-output mobile device network comprises three or more cells.

19. The method of claim 18, wherein the suppressing inter-cell interference comprises updating intermediate precoders and decorrelators and the suppressing intra-cell interference comprises further adjusting the intermediate precoders.

20. The method of claim 18, wherein the suppressing intra-cell interference comprises suppressing the intra-cell interference on a per cell basis.

* * * * *